US011119945B1

(12) United States Patent
Truelove et al.

(10) Patent No.: US 11,119,945 B1
(45) Date of Patent: Sep. 14, 2021

(54) CONTEXT TRACKING FOR MULTIPLE VIRTUALIZATION LAYERS IN A VIRTUALLY TAGGED CACHE

(71) Applicant: International Business Machines Corporation, Armonk, NY (US)

(72) Inventors: Jake Truelove, Austin, TX (US); David Campbell, Austin, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/856,134

(22) Filed: Apr. 23, 2020

(51) Int. Cl.
*G06F 12/10* (2016.01)
*G06F 12/08* (2016.01)
*G06F 12/1036* (2016.01)
*G06F 12/0873* (2016.01)
*G06F 12/0846* (2016.01)
(Continued)

(52) U.S. Cl.
CPC ........ *G06F 12/1036* (2013.01); *G06F 9/3009* (2013.01); *G06F 9/30098* (2013.01); *G06F 12/0292* (2013.01); *G06F 12/0808* (2013.01); *G06F 12/0848* (2013.01); *G06F 12/0873* (2013.01)

(58) Field of Classification Search
CPC ............. G06F 12/0877; G06F 12/0292; G06F 12/0848; G06F 12/0873; G06F 12/109; G06F 12/0842; G06F 12/145; G06F 12/1475; G06F 2212/1016; G06F 2212/1052; G06F 2212/151; G06F 2212/655; G06F 12/1036; G06F 12/1063; G06F 2212/1032; G06F 12/0808; G06F 9/3009; G06F 9/30098
See application file for complete search history.

(56) References Cited

U.S. PATENT DOCUMENTS 5,845,325 A * 12/1998 Loo ..................... G06F 12/1063 711/135
8,522,253 B1 * 8/2013 Rozas ................. G06F 12/1063 718/108
(Continued)

OTHER PUBLICATIONS

M. Cekleov and M. Dubois, "Virtual-address caches. Part 1: problems and solutions in uniprocessors," in IEEE Micro, vol. 17, No. 5, pp. 64-71, Sep.-Oct. 1997.*
(Continued)

*Primary Examiner* — Pierre Miche Bataille
(74) *Attorney, Agent, or Firm* — Scully, Scott, Murphy & Presser, P.C.

(57) ABSTRACT

A system of handling electronic information having a virtually tagged cache having a directory and a plurality of entries containing data, the directory containing multiple entries, each entry configured to comprise at least a virtual address and one of a plurality of context tags, wherein each context tag is an encoding for one of a plurality of layers of address space; a context tag table having a plurality of entries, each entry configured to map one of the plurality of context tags to one of the plurality of layers of space; and a scratch register containing a current context tag for a current layer of address space on which the processor is operating. The virtually tagged cache is configured to preserve information in the virtually tagged cache when performing a context switch in the system.

20 Claims, 14 Drawing Sheets

(51) Int. Cl.
   *G06F 9/30* (2018.01)
   *G06F 12/02* (2006.01)
   *G06F 12/0808* (2016.01)

(56) References Cited

U.S. PATENT DOCUMENTS

| | | |
|---|---|---|
| 9,311,239 B2 | 4/2016 | Cooray et al. |
| 9,323,715 B2 | 4/2016 | Mukherjee et al. |
| 10,613,989 B2* | 4/2020 | Rusitoru ............. G06F 12/1036 |
| 2008/0162811 A1* | 7/2008 | Steinmetz ............. G06F 3/0617 |
| | | 711/114 |
| 2018/0196692 A1 | 7/2018 | Hepkin |

OTHER PUBLICATIONS

Y. Marathe, N. Gulur, J. H. Ryoo, S. Song and L. K. John, "CSALT: Context Switch Aware Large TLB*," 2017 50th Annual IEEE/ACM International Symposium on Microarchitecture (MICRO), 2017, pp. 449-462.*

A. Wiggins and G. Heiser, "Fast address-space switching on the StrongARM SA-1100 processor," Proceedings 5th Australasian Computer Architecture Conference. ACAC 2000 (Cat. No. PR00512), 2000, pp. 97-104.*

Xiaogang Qiu and M. Dubois, "Towards virtually-addressed memory hierarchies," Proceedings HPCA Seventh International Symposium on High-Performance Computer Architecture, 2001, pp. 51-62.*

Jammula, N., et al. "Reducing Cache-Associated Context-Switch Performance Penalty Using Elastic Time Slicing", VMware Technical Journal (VMTJ Winter 2015), Feb. 2015, pp. 23-34, vol. 4, No. 1.

* cited by examiner

Case A.1 Table

| CTXT TAG | LPID | PID |
|---|---|---|
| 0 | 0x11A | 0x23746 |
| 1 | 0xABC | 0x11284 |
| 2 | 0x11B | 0x11284 |
| 3 | 0x223 | 0x37857 |

Case B Table

| CTXT TAG | LPID |
|---|---|
| 0 | 0x11A |
| 1 | 0x752 |
| 2 | 0xABC |
| 3 | 0x223 |

Case C Table

| CTXT TAG | PID |
|---|---|
| 0 | 0x23746 |
| 1 | 0x23752 |
| 2 | 0x11284 |
| 3 | 0x37857 | mtlpid: 0x11B

LPIDR: 0xABC

PIDR: 0x11284

Current Context Tags:
A: 1
B: 2
C: 2
D: Always 0

Fig. 18

Case A.1 Table

| CTXT TAG | LPID | PID |
|---|---|---|
| 0 Hit! | 0x11A | 0x23746 |
| 1 | 0xABC | 0x11284 |
| 2 | 0x11B | 0x11284 |
| 3 | 0x223 | 0x37857 |

Case B Table

| CTXT TAG | LPID |
|---|---|
| 0 Miss! | 0x11A |
| 1 | 0x752 |
| 2 | 0xABC |
| 3 | 0x223 |

Case C Table

| CTXT TAG | PID |
|---|---|
| 0 | 0x23746 |
| 1 | 0x23752 |
| 2 | 0x11284 |
| 3 | 0x37857 | mtlpid: 0x11B

LPIDR: 0xABC

PIDR: 0x11284

Current Context Tags:
A: 1
B: 2
C: 2
D: Always 0

Fig. 19

Case A.1 Table

| CTXT TAG | LPID | PID |
|---|---|---|
| 0 | 0x11A | 0x23746 |
| 1 | 0xABC | 0x11284 |
| 2 | 0x11B | 0x11284 |
| 3 | 0x223 | 0x37857 | mtlpid: 0x11B  1112  1807

LPIDR: 0x11B
PIDR: 0x11284  1570

Case B Table  1114

| CTXT TAG | LPID |
|---|---|
| 0 | 0x11A |
| 1 | 0x752 |
| 2 | 0xABC |
| 3 | 0x11B |

Case C Table  1116

| CTXT TAG | PID |
|---|---|
| 0 | 0x23746 |
| 1 | 0x23752 |
| 2 | 0x11284 |
| 3 | 0x37857 |

1130

Current Context Tags:
A  2
B  3
C  2
D  Always 0

Fig. 20

Case A.1 Table

| CTXT TAG | LPID | PID |
|---|---|---|
| 0 | 0x11A | 0x23746 |
| 1 | 0xABC | 0x11284 |
| 2 | 0x11B | 0x11284 |
| 3 | 0xABC | 0x37857 | mtlpid: 0x37857  1112  2107

LPIDR: 0xABC
PIDR: 0x11284  1570

Case B Table  1114

| CTXT TAG | LPID |
|---|---|
| 0 | 0x11A (Not Searched) |
| 1 | 0x752 (Not Searched) |
| 2 | 0xABC |
| 3 | 0x223 |

Case C Table  1116

| CTXT TAG | PID |
|---|---|
| 0 | 0x23746 |
| 1 | 0x23752 |
| 2 | 0x11284 |
| 3 | 0x48592 |

1130

Current Context Tags:
A  1
B  2
C  2
D  Always 0

Fig. 21

Case A.1 Table

| CTXT TAG | LPID | PID |
|---|---|---|
| Hit! | 0x11A | 0x23746 |
| 1 | 0xABC | 0x11284 |
| 2 | 0x11B | 0x11284 |
| 3 | 0xABC | 0x37857 | mtpid: 0x37857

LPIDR: 0xABC

PIDR: 0x11284

Case B Table

| CTXT TAG | LPID |
|---|---|
| 0 | 0x11A |
| 1 | 0x752 |
| 2 | 0xABC |
| 3 | 0x223 |

Not Searched

Case C Table

| CTXT TAG | PID |
|---|---|
| 0 | 0x23746 |
| 1 | 0x23752 |
| 2 | 0x11284 |
| 3 | 0x48592 |

Miss!

Current Context Tags:
A  1
B  2
C  2
D  Always 0

Fig. 22

Case A.1 Table

| CTXT TAG | LPID | PID |
|---|---|---|
| 0 | 0x11A | 0x23746 |
| 1 | 0xABC | 0x11284 |
| 2 | 0x11B | 0x11284 |
| 3 | 0xABC | 0x37857 | mtpid: 0x37857

LPIDR: 0xABC

PIDR: 0x37857

Case B Table

| CTXT TAG | LPID |
|---|---|
| 0 | 0x11A |
| 1 | 0x752 |
| 2 | 0xABC |
| 3 | 0x223 |

Not Searched

Case C Table

| CTXT TAG | PID |
|---|---|
| 0 | 0x23746 |
| 1 | 0x23752 |
| 2 | 0x11284 |
| 3 | 0x37857 |

Current Context Tags:
A  3
B  2
C  3
D  Always 0

Fig. 23

CONTEXT TRACKING FOR MULTIPLE VIRTUALIZATION LAYERS IN A VIRTUALLY TAGGED CACHE

The disclosure herein relates generally to information handling and/or data processing systems, and more particularly, to methods, apparatus, and systems for tracking, handling, and managing multiple layers of address space in virtual caches in an information handling system, e.g., a computer system.

Among other tasks, memory management manages the data stored in a computer system including overseeing the retrieval and storage of data from memory in a computer system. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

Virtual memory management systems can include a hypervisor or virtual machine monitor (VVM), which is computer software, firmware, or hardware that creates and runs multiple virtual machines as guests on a computer system where computing resources such as memory and processing capability are shared. With a virtual memory system, the underlying hardware implementing the memory system of a computer is effectively hidden from the software of the computer. Computer programs that execute on the virtual computer access the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map virtualized addresses in the virtual memory space to the real memory addresses of the physical memory. As such, in one or more embodiments, whenever a computer program on a computer attempts to access memory using a virtualized address, the computer translates the virtualized address into a corresponding real address so that access can be made to the appropriate location in the appropriate physical device.

Often, due to the large number of memory accesses that constantly occur in a computer, the number of entries required to map all of the memory address space in use by a computer can be significant, and requires the numerous entries mapping the address translations to be stored in main storage, rather than in dedicated memory, which makes accessing such entries slow. To accelerate address translation, modern processors typically contain high speed memories or caches that are used to store recently-used address translations for quick access by the computer. For example, an effective address (also referred to as a virtual address) to real address table (ERAT) can be used to cache address translations. With each memory access, the address to be translated is presented to the ERAT, and if the ERAT has a match (hits), an address, e.g., real address (RA), is provided to the processor. If the address misses in the ERAT, then main storage should be checked for the address translation, and in embodiments a more costly hardware handler or software handler is invoked to load and insert the required translations into the address translation cache (e.g., ERAT) so the address will hit in the translation cache and the memory access can proceed.

The address translation data structures residing in cache memory for the processor, and the address translation tables residing in main memory all participate in virtual memory address translation and all these tables and data structures must be properly managed. For example, when a hypervisor takes down a process on a given system, any remnants of old translations to the old process memory should no longer be accessible by any other software program running on the system. To prevent old data from being accessed by software programs running on the system, e.g. a virtual user, an invalidation operation is performed to remove any old translations related to the process that was just removed. Because of the size of the translation data structures, this translation invalidation process can take a long time and can affect system performance. As such, it is desirable to minimize the amount of time the system is tied up performing address translations, invalidating old translations and old data in the translation and data caches, and moving data into and out of the translation and data caches for use by the processor.

One way to minimize time in performing address translations is to eliminate translations between virtual or effective addresses and real addresses to the extent possible. One way to eliminate having to perform translations and shuffling of data and translations into and out of the caches is to utilize a virtualized address translation architecture containing virtual caches. When building a system that uses virtual caches, instructions no longer need to go through translation from Virtual Address (VA) to Real address (RA) before accessing caches. Instructions can instead look up VA's directly. This presents a problem, however since identical VA's can exist in multiple contexts. A fully virtualized address translation architecture will have multiple accessible address spaces. For example, there can be four (4) layers of address spaces in an illustrative embodiment of a virtualized environment: hypervisor, hypervisor processes, partition address spaces (i.e. guest operating system (OS)), and process address spaces (i.e. guest OS applications). Contexts define these layers of address spaces. A single hardware thread can have several active contexts, for example, the four (4) contexts defined above, and can switch between them dynamically without doing a software context switch. The system should know that cached translations from one layer of address space should not be accessible to a thread running in another layer of address space. Accordingly, when a thread switches between layers of address space, the cached translations that still exist in the system should not be accessible to the thread operating in the new layer of address space.

In addition to multiple contexts and address spaces accessible to a hardware thread without doing a software context switch, a highly virtualized system will also have many contexts running on a system that are accessible via software context switches performed at a per thread granularity. Translations relating to a given context should not be accessible to other contexts, and any system should have a method of preventing hardware threads from accessing cached translations of external contexts.

One way to insure that translations from one layer of address space are not accessible to another layer of address space upon a context switch is to invalidate all translations for that hardware thread. In a system that is highly virtualized this is not ideal. There is a great deal of overhead to traverse all the caches and invalidate all translations relating to a given hardware thread and would greatly increase the time that it takes for a system to do a context switch. In addition, invalidating all translations for a given hardware thread eliminates the benefits a system has of having translations cached. In this scenario, any time a context is switched into, the context will no longer have its translations warm in the caches and will need to go through the long latency process of translating an effective address that could have been stored in the caches.

SUMMARY

The summary of the disclosure is given to aid understanding of a computer system, computer architectural structure, processor, memory system, and method of translating addresses and invalidating address translations in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, memory system, and their method of operation to achieve different effects.

A system of handling electronic information is disclosed that includes: a processor for processing the electronic information; at least one virtually tagged cache having a directory and a plurality of entries containing electronic information, the directory containing multiple entries, each entry configured to comprise at least a virtual address and one of a plurality of context tags, wherein each context tag is an encoding for one of a plurality of layers of address space containing less bits than the number of bits to represent the one of the plurality of layers of address space; a context tag table having a plurality of entries, each entry configured to map one of the plurality of context tags to one of the plurality of layers of space; and a scratch register having one or more entries and configured to contain a current context tag for a current layer of address space on which the processor is processing a thread of instructions. In one or more embodiments, the virtually tagged cache is configured to preserve information in the virtually tagged cache when performing a context switch in the system to process electronic information from a new layer of address space different than the current layer of address space on which the processor is operating. In an aspect the system permits more than one layer of address space to be dynamically accessible at any given time to a hardware thread. The system in an aspect is configured, in response to encountering a context switch to a new context having a new layer of address space, to search for the new context in the context tag table, and in an aspect includes obtaining a new context tag from the scratch register to compare against context tags in the context table.

The system in an aspect is configured to, in response to the new context tag being present in the context tag table, updating the system to the new context tag, which in an embodiment includes writing the new context tag to the scratch register. The system can also be configured to, in response to the new context not being contained within the context tag table, add a new context tag for the new context to the context tag table. In response to the new context not being contained within the context tag table, the system can be configured to select an entry to remove from the plurality of entries in the context tag table. The system in one or more embodiments is configured to invalidate all entries in the one or more virtually tagged caches that have the same context tag as the selected entry removed from the context table, and further in an aspect is configured to invalidate only the entries in the one or more virtually tagged caches that have the same context tag as the selected entry removed from the context table. In response to removing the selected entry from the context tag table, the system in an embodiment is configured to update the selected entry removed from the context table to have the context tag and associated mapping to one of the plurality of layers of address space of the new context tag. The system is configured in an embodiment to perform a memory access operation to the virtually tagged cache, where the access operation includes obtaining from the scratch register the current context tag and comparing at least the current context tag from the scratch register to context tags in entries in the directory of the virtually tagged cache.

A computing system is disclosed that in an aspect further includes a non-transitory computer-readable storage medium comprising program instructions that when executed by the processor cause the system to: preserve information in the virtually tagged cache when performing a context switch in the system to process information from a new layer of address space different than the current layer of address space on which the processor is operating; in response to a memory access, obtain from the scratch register the current context tag; and compare at least the current context tag from the scratch register to context tags in entries in the directory of the virtually tagged cache. The system in a further embodiment includes program instructions that when executed by the processor cause the system to: in response to encountering a context switch to a new context having a new layer of address space, search for the new context tag in the context tag table; in response to searching for the new context in the context tag table; and in response to the new context tag being present in the context tag table, update the system to the new context tag; and in response to the new context not being contained within the context tag table, select and remove an entry from the plurality of entries in the context tag table, invalidate only the entries in the one or more virtually tagged caches that have the same context tag as the selected entry removed from the context table, and update the selected entry removed from the context table to have the context tag and associated mapping to one of the plurality of layers of address space of the new context tag.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, memory system, virtualization systems, virtual caches, and their method of operation will be better understood when read in conjunction with the figures provided. Embodiments are provided in the figures for the purpose of illustrating aspects, features, and/or various embodiments of the computer system, computer architectural structure, processors, memory systems, and their method of operation, but the claims should not be limited to the precise arrangement, structures, features, aspects, systems, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

FIG. 18, FIG. 19, and FIG. 20 show another example of a virtualized information handling system having four context cases or layers of address space undergoing a context switch.

FIG. 21, FIG. 22, and FIG. 23 show another example of a virtualized information handling system having four context cases or layers of address space undergoing a context switch.

DETAILED DESCRIPTION

Figure 1:
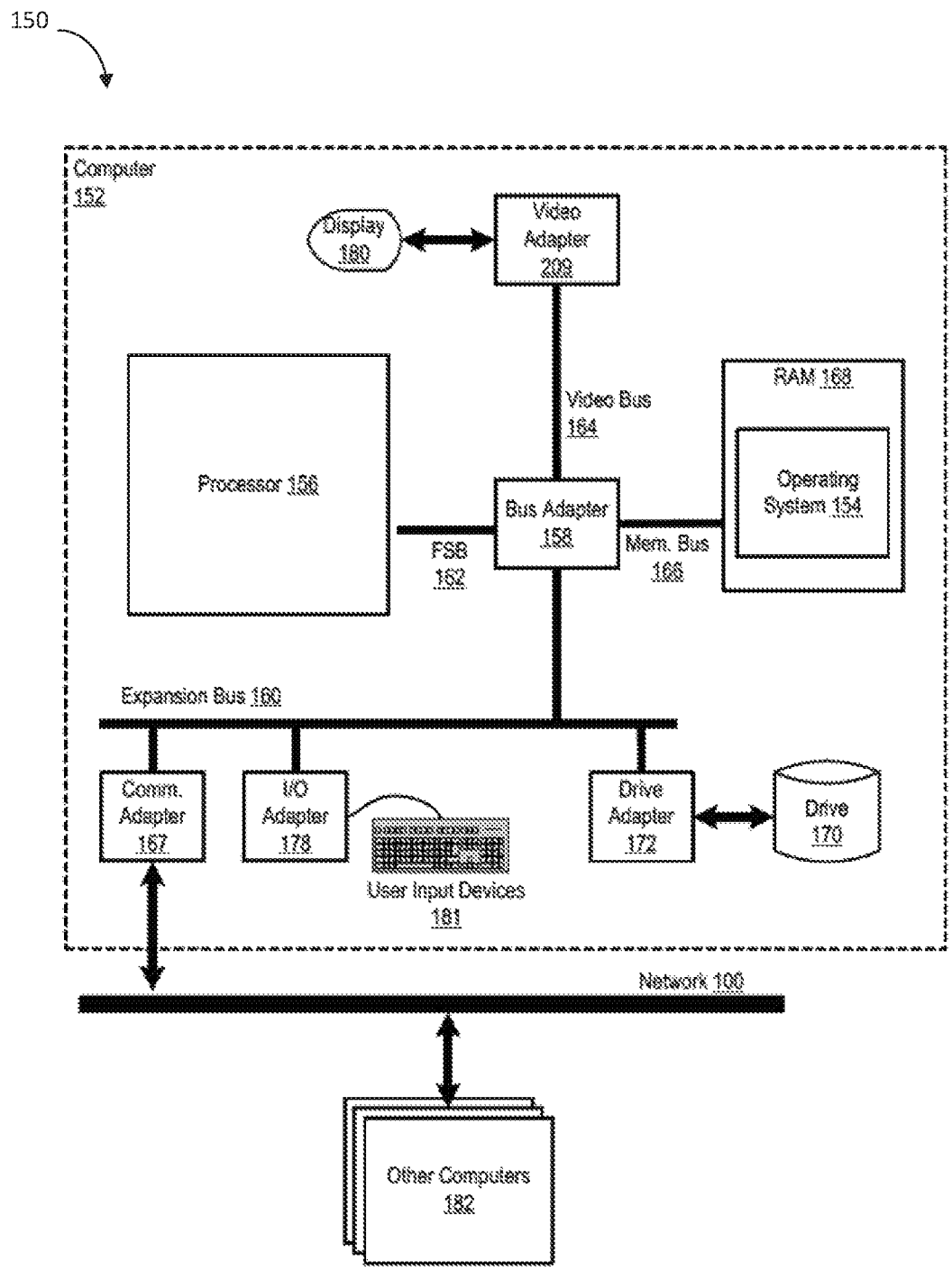
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, memory system, virtualized information handling system, virtual caches, and their method of operation, however, it will be understood by those skilled in the art that different and numerous embodiments of the computer system, computer architectural structure, processor, memory system, virtualized information handling system, virtual caches, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors, microprocessor systems, memory systems, and their architectures, particularly in virtualized environments utilizing virtualized caches, which should be apparent to those skilled in the art. It is assumed that those skilled in the art are familiar with the general architecture of computing systems (also referred to as information/data processing systems), processors, memory systems, virtualized systems, virtualized caches, address translation techniques and systems, and their operation. It may be noted that a numbered element is numbered according to the figure in which the element is introduced, and is typically referred to by that number throughout succeeding figures.

Virtual caches and virtually tagged caches typically reside in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components such as, for example, data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1. The present disclosure encompasses any computing structure, including personal computers, servers, and mainframe computing structures including multiple CPUs.

Figure 2A:
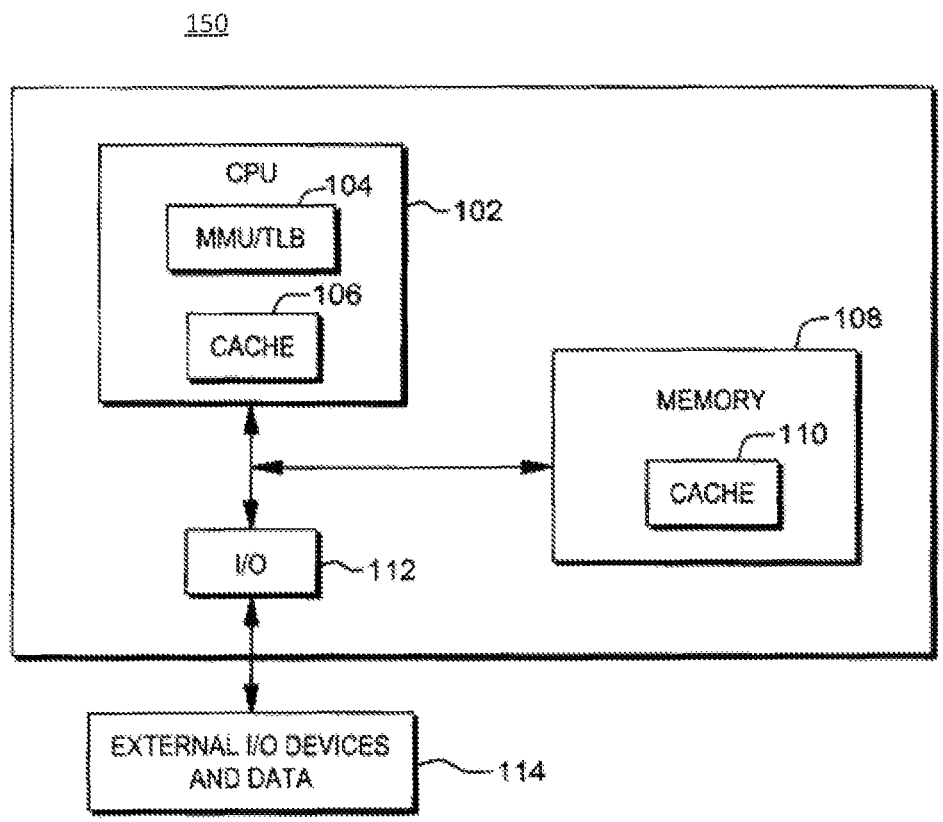
FIG. 2A depicts one example of a computing environment.

One example of a computing environment to incorporate and use one or more aspects of virtually tagged caches is described with reference to FIG. 2A. In one example, a computing system 150 includes a processor (central processing unit—CPU) 102 that includes at least a cache 106 and at least one memory management unit (MMU) having a translation look-aside buffer (TLB), referred to as MMU/TLB portion 104. Processor 102 is communicatively coupled to a memory portion 108 that can contain a cache 110, and to an input/output (I/O) portion 112. I/O portion 112 is communicatively coupled to external I/O devices 114 that may include, for example, data input devices, sensors and/or output devices, such as displays.

Memory management unit (MMU) 104 is used in managing memory portion 108 including facilitating access to the memory by providing address translation. In an embodiment, to improve address translation, the memory management unit (MMU) utilizes a translation look-aside buffer (TLB). The TLB is a cache of previously translated addresses. Thus, when a request is received for a memory access that includes an address to be translated, typically the TLB is checked first. If the address is cached in the TLB, then the address is provided to the processor. Otherwise, the received address is translated using one of any number of translation techniques, including a tablewalk process.

Figure 2C:
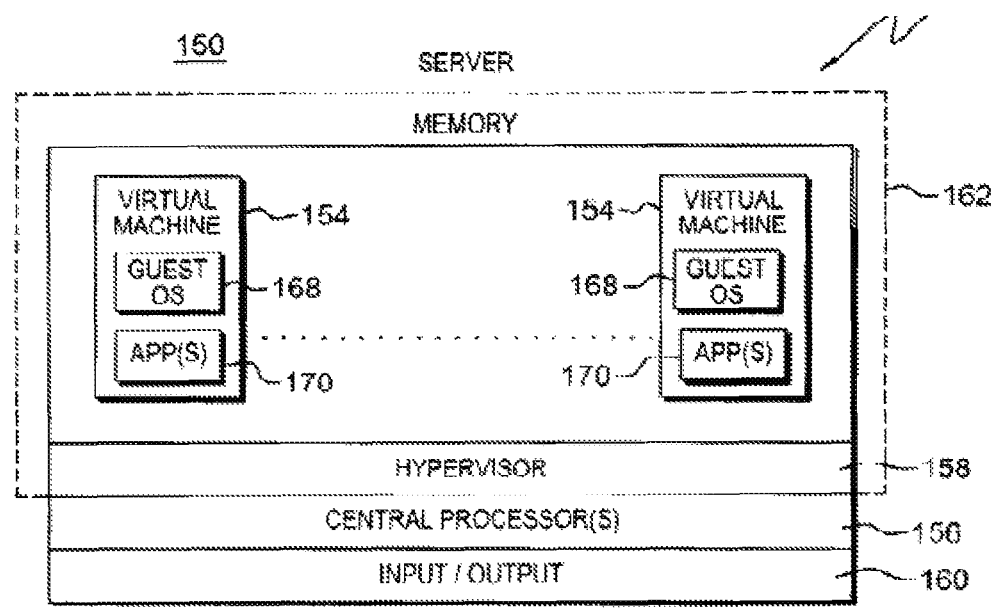
FIG. 2C is a block diagram illustrating a virtualized computing system within which virtual caches according to embodiments of the present disclosure can be implemented.
Figure 2B:
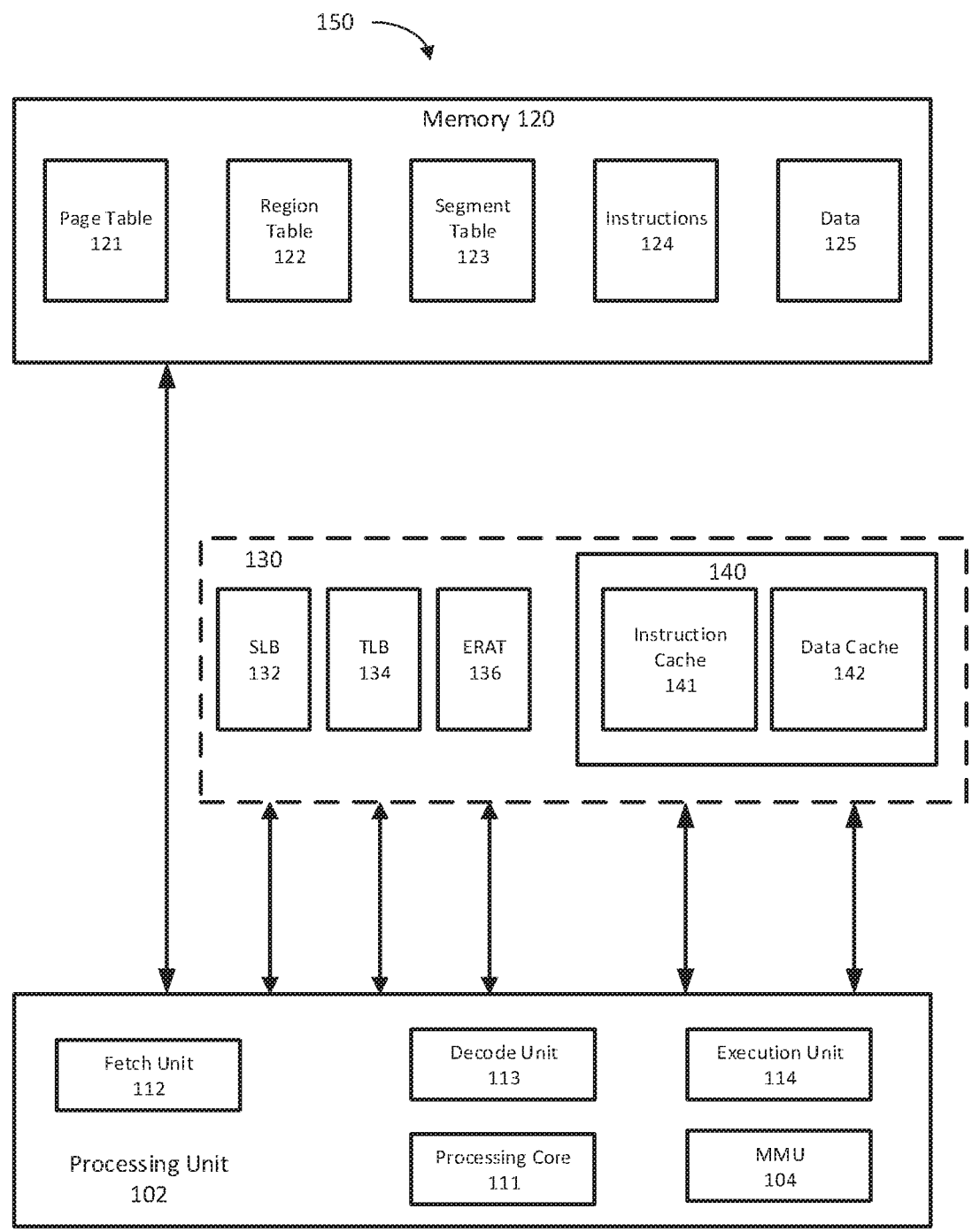
FIG. 2B depicts another example of a computing environment.

FIG. 2B illustrates a block diagram showing a more in depth view of an embodiment of a processing system 150 that represents one suitable environment within which virtually tagged caches can be implemented. The processing system 150 includes a processing unit 102, and memory 120. The processing system 150 can include a number of caching structures 130 for quick access by the processor 102, including address translation caching structures and cache memory 140. Address caching structures can include a segment look-aside buffer (SLB) 132, a translation look-aside buffer (TLB) 134, and an effective to real address translation (ERAT) cache 136. Cache memory 140 includes instruction cache 141 and the data cache 142, which store instructions and data, respectively, for quick access by the processing unit 102 during execution of instructions. The caching structure 140 although illustrated as outside the processor 102 is typically included in the processor 102.

The processing unit 102 receives data, such as operand data, and instructions and executes the instructions. The processing unit 102 may include, for example, a processing core 111 including logic and other circuitry for processing data and instructions, a fetch unit 112 configured to fetch instructions, a decode unit 113 configured to decode instructions, a MMU 104 for managing memory, and an execution unit 114 configured to execute the instructions. The execution unit may include a Load Store Unit (LSU). Although a few functional units of the processing unit 102 are illustrated for purposes of description, it is understood that the processing unit 102 may include additional functional units for retrieving, processing, and storing instructions and data.

The processing system 150 further includes main memory 120 configured to store tables, such as a page table 121, region table 122, and segment table 123, as well as instructions 124 and data 125 which may be accessed and manipulated by the instructions 124. The page table 121, region table 122, and segment table 123 are collectively described as dynamic address translation (DAT) structures 121, 122, and 123. The memory 120 may include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processor processing unit 102.

Modern computers typically rely on a memory management technique known as virtual memory management to increase performance and provide greater flexibility in computers and the underlying architectural designs upon which they are premised. Virtual memory management systems can include a hypervisor or virtual machine monitor (VVM), which creates and runs multiple virtual machines as guests on a computer system where computing resources such as memory and processing capability are shared.

An embodiment of a virtualized computing environment that can incorporate and use one or more aspects of the present invention is depicted in FIG. 2C. In this example, a computing system 150 includes a server 152 that includes, for instance, one or more virtual machines 154, one or more central processor(s) (e.g., central processing units) 156, at least one hypervisor 158, and an input/output subsystem 160. The virtual machines 154 and hypervisor 158 are included in memory 162.

In this embodiment, each virtual machine is capable of hosting a guest operating system 168 and may be executing one or more applications 170. An operating system or application running on a virtual machine 154 appears to have access to a full complete system, but in reality, only a portion of it is available. Central processor(s) 156 (e.g., central processing units) are physical processor resources that are assignable to a virtual machine 154. For instance, virtual machine 154 includes one or more logical processors, each of which represents all or a share of physical processor(s) 156 that may be dynamically allocated to the virtual machine. Virtual machines 154 are managed by hypervisor 158, such as PowerVM, offered by International Business Machines Corporation, as an example. Central processor(s) 156, like CPU 102, includes at least one MMU/TLB portion and at least one cache.

Computer programs that execute on virtual computers access the memory system using addresses pointing to locations in the virtual memory space. The physical memory devices, however, are accessed by "real" addresses that map directly into specific memory locations in the physical memory devices. Hardware and/or software is provided to perform address translation to map virtualized addresses in the virtualized memory space to real memory addresses in the physical memory.

When running virtualization on processors, a fully virtualized address translation architecture will have multiple layers of accessible address spaces. For example, depending upon the virtualization architecture, in one or more embodiments, there are four (4) layers of address spaces; hypervisor, hypervisor processes, (logical) partition address spaces (i.e. guest operating system (OS)) utilizing logical partition identifiers referred to as (LPIDs), and process address spaces (i.e. guest OS applications) utilizing process identifications referred to as (PIDs). Contexts define these layers of address spaces. A system can have many contexts running at a time and can switch between them through software context switches. A single hardware thread can have several active contexts, for example the four (4) contexts as defined above, and can switch between them dynamically without doing a software context switch. The system should know that cached translations from one layer of address space should not be accessible to a thread running on another layer of address space. Accordingly, when a thread switches between layers of address space, the cached translations that still exist in the system should not be accessible to the thread operating in the new layer of address space.

For example, a hardware thread, call it thread 2 (t2) of a system is running on context A which is defined by a virtual machine marked with logical partition ID (LPID) 5 and is running an application with process ID (PID) 3. Thread 2 (t2) may be executing this guest OS application (PID=3) and hit an exception which causes the thread to move into the address space of the guest OS. Some exception handling routine may execute in the guest OS address space and then move back into the guest OS application to continue running. In this case, there may be translations that were cached relating to the guest OS address space. The system should know that these cached guest OS address space translations should not be accessible to a thread running in the guest OS application address space. In addition, this same scenario is possible one layer up. A thread may need to move from a guest OS address space into the hypervisor address space. In this case when the thread (or a different thread) is back to operating and executing in the guest OS address space, the cached translations of the hypervisor that still exist in the system should not be accessible to the thread in the guest OS address space.

Often moving between these layers of address space is not handled through a software context switch. In fact, hardware thread 2 (t2) above moved from the guest OS process (LPID=5,PID=3) to the guest OS(LPID=5) without doing a software context switch. Which layer of address space the hardware thread is running in depends on several permissions which can change dynamically. In addition to the multiple contexts and layers of address spaces accessible to a hardware thread without doing a software context switch, a highly virtualized system will also have many contexts running on a system that are accessible via software context switches performed at a per thread granularity. Translations relating to a given context should not be accessible to other contexts, and any system should have a method of preventing hardware threads from accessing cached translations of external contexts. To make sure that the appropriate address translations and data are being accessed, the address translation caches and data caches often need to be invalidated and removed on a context switch.

The address translation data structures residing in cache memory for a processor, and the address translation tables residing in main memory all participate in virtual memory address translation, and all these tables and data structures must be properly managed so that the correct address translation is being used. Performing the numerous address translations and look-ups can hurt the performance of a computing system. Moreover, the number of contexts in a virtualized computing environment and invalidating the address data in translation and data caches can also hurt the performance of the system.

One manner to minimize time in performing address translations is to eliminate translations between virtual or effective addresses and real addresses to the extent possible. One way to eliminate having to perform address translations and shuffling of data and address translations into and out of caches is to utilize a virtualized address translation architecture using virtual caches. When building a system that uses virtual caches, instructions no longer need to go through translation from virtual addresses (VA) to real addresses (RA) before accessing caches. Instructions can instead look up VA's directly. Using virtual caches however presents a problem since identical VA's can exist in multiple contexts.

One way to overcome the problem of multiple VA's existing in multiple contexts, and insuring that the processor is working in the correct layer of address space, is to invalidate all translations for a hardware thread any time the system does a software context switch. In a system that is highly virtualized this is not ideal. There is a great deal of overhead to traverse all the caches and invalidate all translations relating to a given hardware thread that would greatly increase the time that it takes for a system to do a context switch. In addition, it eliminates the benefits of a system that caches translations. In this scenario, any time a context is switched into, the context will no longer have its translations warm in the caches and will need to go through the long latency process of translating an effective address that could have been stored in the caches.

Another method of overcoming the problem of identical VA's existing in multiple contexts is to tag all entries in a virtual cache with an LPID/PID to mark the specific context of the translations. This allows systems to do contexts switches (move between VMs and applications) and keep translations not relating to current contexts in the caches thus minimizing the penalty for doing context switches and needing to redo translations that could have otherwise been cached. This system would also allow a hardware thread to move dynamically between the address spaces accessible without doing software context switches since the cached entry would carry identifiers as to which address space the translation applies to. However, this method requires a great deal of overhead in the caches. In order to design a processor that is capable of running numerous virtual machines and even more processes under each of those virtual machines, the LPID and PID both need to be many bits. This means that for every entry, every LPID and PID bit needs to be added to the caches, thus greatly increasing the size of all the caches in the processor.

In one or more embodiments, virtual caches can be tagged with a representative encoding of the LPID & PID that has less bits than the combined total number of LPID and PID bits. This encoding or tagging reduces the overhead of carrying the LPID and PID bits in every entry of the virtual cache directory. It also eliminates the need to do a broadside invalidate of all translations relating to a given context when a software context switch happens in a system. This increases the caching efficiency of a virtual cache because it preserves cache data when doing a context switch in a system. In addition, a different representative encoding, e.g., tag, could be used to distinguish each different layer of address space possible for a given hardware thread. This allows more than one layer of address space for a given hardware thread to be accessible at the same time. These layers of address spaces in an embodiment include those of the hypervisor, hypervisor processes, guest operating system (virtual machine), and guest (virtual) applications.

A system in one or more embodiments has virtually tagged caches and contains a structure tracking the history of LPIDs and PIDs running on each hardware thread. This structure, for example, a context tag table, maps an LPID/PID to several tags such that the index of the structure is the representative encoding used to tag the virtually tagged cache. Each entry in the structure, e.g., a context tag table, contains the full LPID/PID of the addressable context. In the example above there would be four tags for a given hardware thread, corresponding to the layer of address space for the Hypervisor, Hypervisor Process, Guest OS, and Guest Processes or Applications (running on the Guest OS). These tags would be fewer bits than the LPID/PID since the structure only holds the tags for a small number of contexts. The structure, e.g., the context tag table, is not meant to hold all the contexts a system could contain, but overall these representative encodings, e.g., tags, are used to qualify translations in virtual caches as members of a layer of address space, they take up less space than a full LPID/PID combination, and they still identify what context the translation represents. The virtual caches contain the tags representing the context of the thread and the caches are referred to as virtually tagged caches. The directory of the virtually tagged caches also contains the tags, i.e., the encoding representing the LPID/PID combination. The context tags can be used for any virtually tagged cache in a system. The virtually tagged cache can contain anything, including, data, instructions, or address translations. A virtually tagged cache is a cache that has an index or look-up that uses a virtual address, e.g., a VA or effective address (EA).

In operation, in one or more embodiments, when a software context switch happens on a hardware thread, the new LPID/PID is looked up in the context tag structure, e.g., the context tag table. In an aspect, if the tag, e.g., the LPID/PID combination, already exists in the structure (e.g., the context tag table), then the new context had previously been running on the system. It also means that there may still be translations in the virtually tagged caches that pertain to the context, and nothing needs to happen with regards to the context tag structure and the virtually tagged caches could already contain the context's data. If in an aspect a software context switch happens on a hardware thread and the tag, e.g., the new LPID/PID combination, is not in the context tag structure, then the new context should be written to the structure, e.g., the context tag table, and new tags can be assigned to its layers of address space: e.g., one for the hypervisor, hypervisor process, guest OS, or guest OS's process (applications). If the tag is not in the structure, e.g., the context tag table, and the structure is full, in an embodiment, a non-running context within the structure should be evicted, and all entries in all virtually tagged caches that pertain to that context should be removed from all virtually tagged caching structures. The entries should be removed because once the context is removed from the context tag structure there is no longer any mapping of the old context's LPID/PID to the tags used for the entries in the virtually tagged caches. In an aspect, once all the entries of the old context have all been removed from the virtually tagged caches, then the new context should be written to (e.g., updated in) the structure, e.g., the context tag table.

The above system and techniques of using virtually tagged caches reduces the number of bits needed to map a translation to a context, and reduces the number of bits stored in the virtual caches. The context tags also allow those entries to persist in the caches even when there is no thread running on that context because there is a context tag structure that maps those entries to a specific context.

Invalidation of entries in the virtually tagged caches, in one or more embodiments, should be dealt with carefully when using a context tag structure. Since entries in virtually tagged caches can exist even when their context is not currently running, there should be a method to invalidate the entries when a relevant invalidate instruction comes along. If there is an invalidation instruction, it should be checked against the context tag structure (table). If the context that pertains to the invalidate instruction exists in the context tag structure, the processor in an embodiment should traverse all caches and make sure any relevant entries are removed. If the invalidate instruction does not hit on the context tag structure, then it can be concluded that no entries exist in the virtually tagged caches pertaining to that context.

Finally, the virtually tagged caches must keep track of the running representative encodings (e.g., tags) for all threads of a system. For each hardware thread the cache should contain the encodings (tags) for each of the layers of address space that can exist for the context running on that thread. As an example, a system that contains four hardware threads should contain sixteen (16) current context tags (4 threads×4 layers of address space=16). This permits, in an aspect, a thread to dynamically move into any of the layers of address space and still hit on cached translations. If an instruction on hardware thread 3 (t3), running in the hypervisor process layer of address space accesses a virtually tagged cache, the virtually tagged cache needs to know what hardware thread 3's (t3's) hypervisor process layer of address space encoding (context tag) is so that it can qualify the virtually tagged cache hit. These "current encodings" (e.g., tags) held in the virtually tagged caches are updated any time there is a context switch for a given thread.

Context tags allow address translations to be shared between threads in a virtually tagged cache, effectively allowing them to share data in the virtual caches. Context tags allow information in the virtual caches, e.g., the I-Cache, Data-Cache and ERAT, to persist beyond their execution time on a given hardware thread. Turning to some examples of implementing context tags in a system, and in one or more embodiments to a system using virtually tagged caches, a context tag in one or more embodiments is a compressed identifier of a layer of address space, and in an aspect, is an encoding of the LPID and/or PID of the running program. Context tags in one or more embodiments are pointers into a context tag table and can be used to tag virtual data caches, virtual instruction caches, and/or virtual translation caches (e.g., ERATs). The system in one or more embodiments contains one or more context tag tables where the context tag table is a hardware structure that contains the full LPID and/or PID information for each context tag being used and keeps a running history of LPIDs and PIDs running on the processor core. The context tag table in an embodiment is globally shared among all hardware threads.

Figure 3:
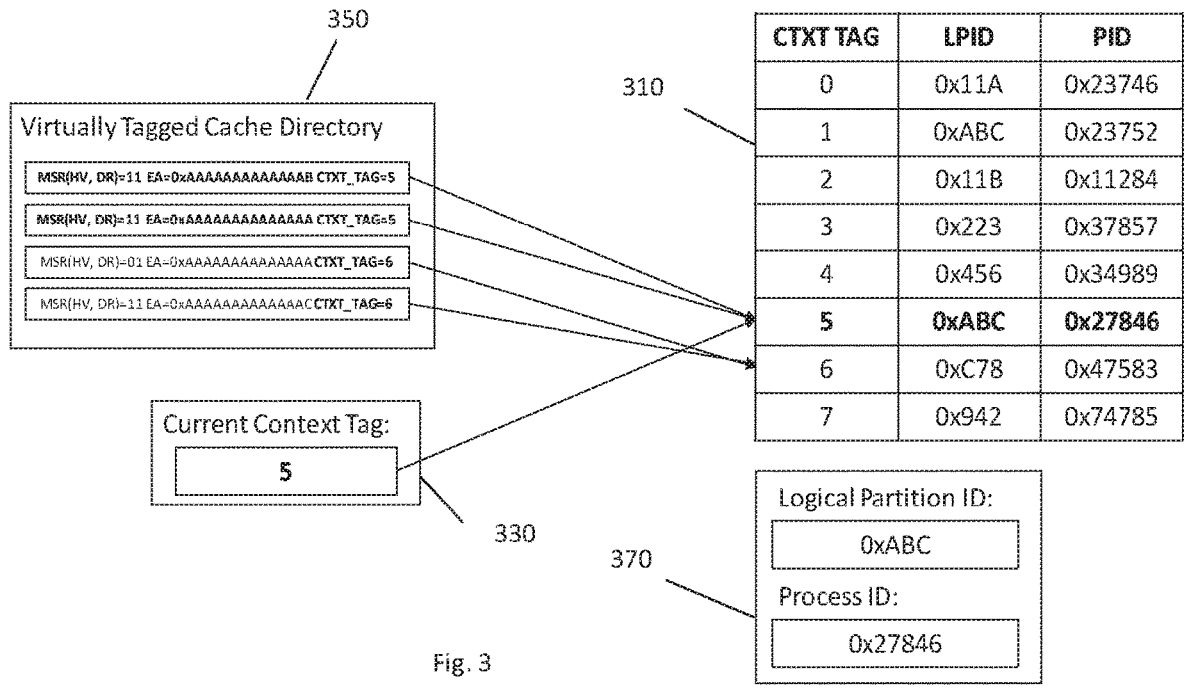
FIG. 3 is an example of an information handling system implementing an embodiment of a virtually tagged cache.

FIG. 3 shows an exemplary block diagram of the pertinent functional units, or modules in an information handling system utilizing virtually tagged caches. FIG. 3 shows an exemplary block diagram of context tag table 310, scratch register 330, the EA cache directory 350 of the virtually tagged (EA) cache, and current thread context register 370 containing the LPID and PID in respective registers LPIDR and PIDR. It can be appreciated that the virtually tagged cache, also referred to as an EA cache, and its associated directory, e.g., Virtual Cache (EA) directory 350, context tag table 310, scratch register 330 and the current thread context register 370, either alone or in combination with other units and modules of the information handling system, including the processor and MMU, contains circuitry and logic to perform the functions as explained in the disclosure. The context tag table 310, the scratch register 330, the virtually tagged (EA) cache and EA directory 350, and the current thread context register 370 are shown for illustrative purposes in the figures and they can each contain more or less entries, and/or data.

In one or more embodiments the system contains a context tag table 310 that maps a context tag to a LPID and/or PID. In an embodiment, the system includes one or more scratch registers 330 that store the current context tag(s) to compare with the contents of a memory access to determine a virtually tagged cache (e.g., EA cache) hit or miss. The scratch register in an embodiment is associated with and/or located next to the virtually tagged caches (e.g., EA cache). The current context tag is the context tag that the hardware thread is currently using. Current context tags are updated on context switches, e.g., mtlpid or mtpid instructions, where mtlpid is a move to LPID instruction and mtpid is a move to PID instruction. FIG. 3 shows an example system running a single thread where the bolded entries are what the current thread has access to and all other information is a history of what was done before the last context switch. Notice that the current context tag, context tag 5 illustrated in the scratch register 330 indexes into the context tag table 310 that matches the current value of the LPIDR and the PIDR illustrated in the current thread context register 370.

Figure 4:
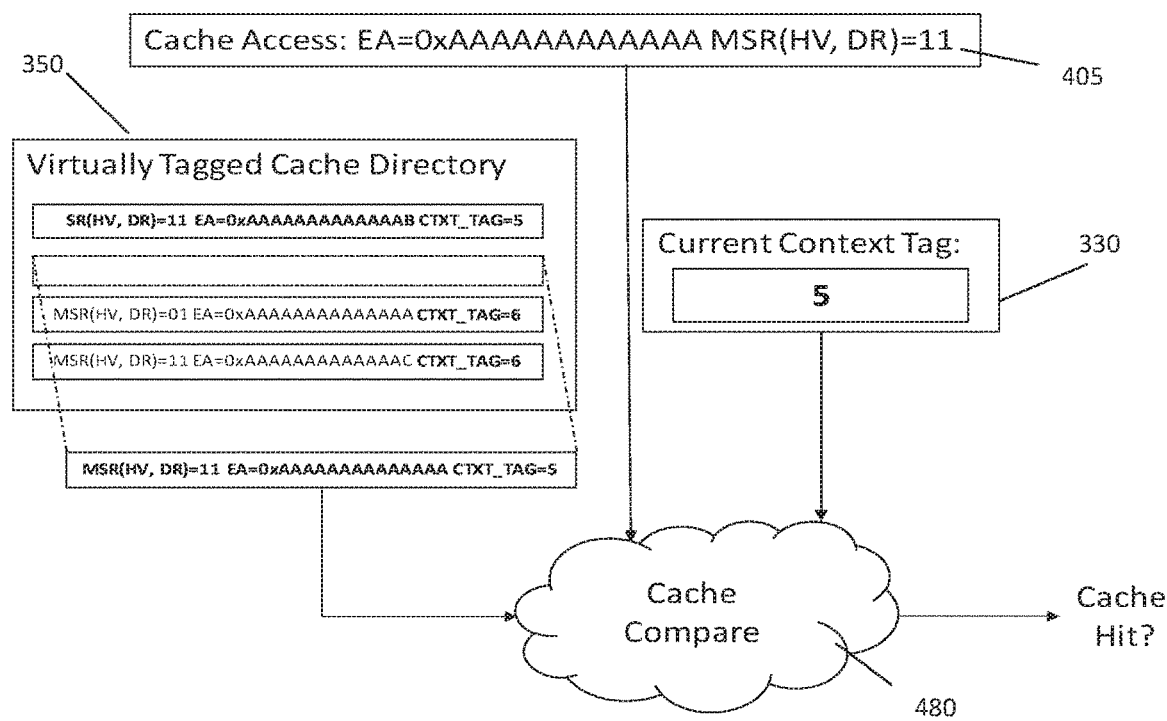
FIG. 4 illustrates a block diagram of an information handling system undergoing access to a virtually tagged cache.

The system contains in one or more embodiments a virtually tagged cache (also referred to as an EA cache), context tag table, and a scratch register. FIG. 4 illustrates a block diagram of a virtually tagged cache undergoing a cache access (look-up) operation in a single thread processor example. The virtually tagged cache, also referred to as an EA cache, contains a directory and a payload. The directory, referred to as a virtually tagged cache directory or EA directory, stores information about what each entry in the EA cache contains (basically the information that a look-up will consider for a match or hit) and the payload holds the information that the look-up wants, e.g., the RA. When the virtually tagged cache is accessed as shown by cache access 405, the contents of the virtual cache (EA) directory 350 (including in an aspect the context tags in the directory entries), are compared (in comparator 480) with the effective address (EA) of the memory access and the context of the memory access. The context of the memory access is determined by the context that the current thread is running, which in one or more embodiments is determined by the current context tag which is provided by the scratch register 330. Other additional information could be part of the comparison. If all these comparisons match (are equal) with an entry in the virtually tagged cache directory, then there is a cache hit and the memory access can proceed. If any of these criteria do not match, there is a virtual cache miss, and the virtual cache (EA) directory is installed with the current context tag.

Figure 5:
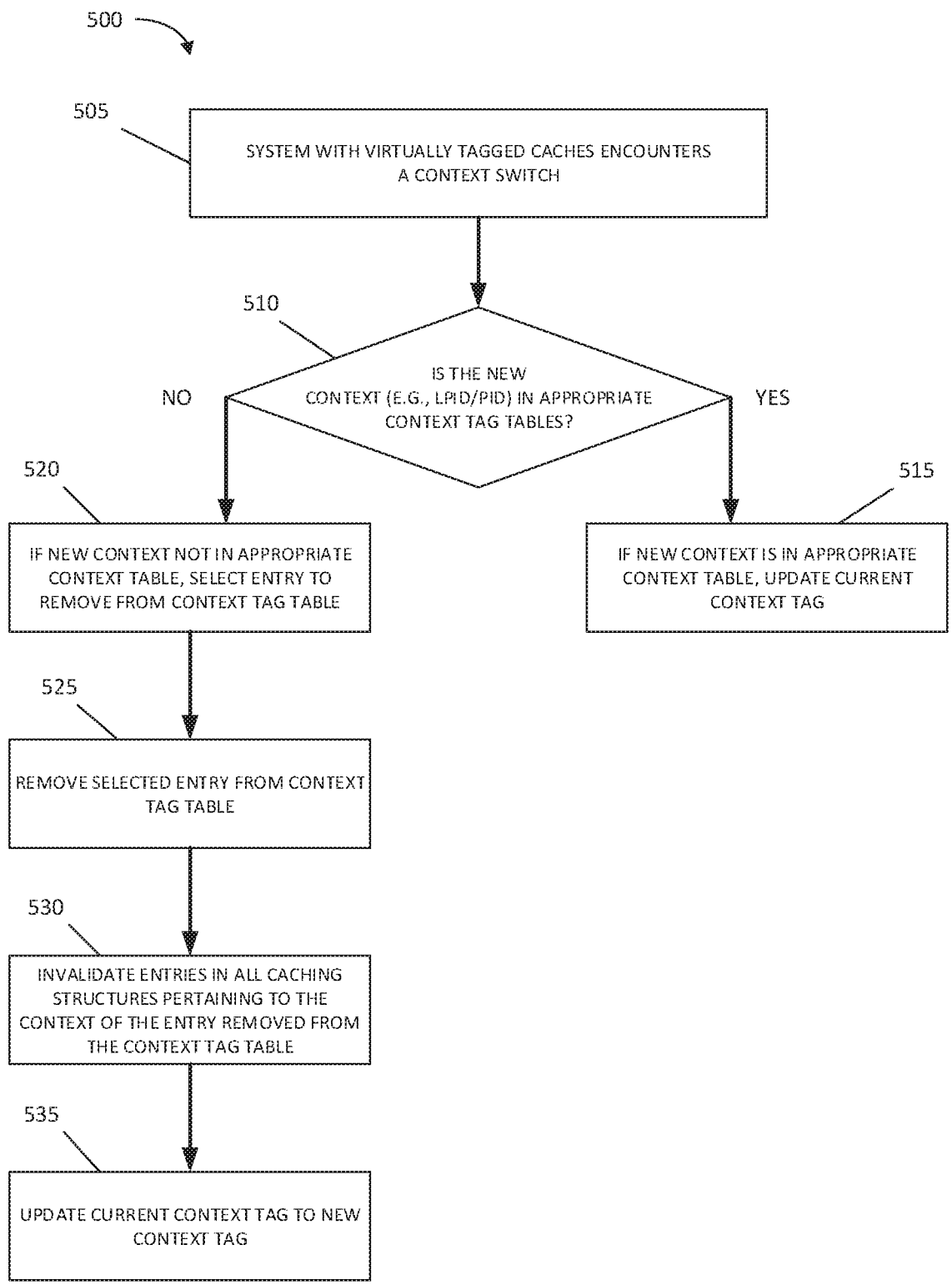
FIG. 5 is an exemplary flowchart illustrating and describing a method of a virtually tagged cache in an information handling system undergoing a context switch.

FIG. 5 is an exemplary flowchart in accordance with one embodiment illustrating and describing a method of undergoing a context switch in a data handling system, including in an embodiment, processing and handling a context switch in a system having virtually tagged caches. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

At 505 the system with virtually tagged caches encounters a context switch. That is, the system is running in a certain layer of address space, e.g. LPID and/or PID, and the processing (e.g., thread) needs to move to a different layer of address space, e.g., a different LPID and/or PID, for example as the result of a mtlpid or mtpid instruction. At 510 it is determined whether or not the new context, e.g., the context tag (in an example having a new LPID and/or new PID), is in the appropriate context tag table. On a context switch the context tag table is searched to assign a new current context tag there can be one or more context tag tables in a system, and in one or more embodiments the system can have a different context tag table for each layer of address space, also referred to as a different context case. Accordingly each appropriate context tag table is searched, e.g., a look-up is performed, to determine whether or not the new context, e.g., the new LPID and/or PID, is present. In this regard the context tag table is searched to determine if it has the context tag of the new context. If the new context tag hits on an entry in the context tag table, then the current context tag is updated to the entry on which there was a hit in the context tag table. That is, if the new context, e.g., the new context tag, is in the context tag table (510: Yes), then at 515 the current context tag is updated to be the new context, e.g., the new context tag, which in an example has a new LPID and/or PID. In one aspect, the scratch registers for that thread are updated to be the context tag that was in the context table that was a match, e.g. at hit. No entries in the virtually tagged caches are invalidated under this scenario.

If the new context (e.g., the new context tag) is not in the context tag table and there is a miss, a victim (e.g., entry) in the context tag table is chosen, for example using any one of a number of criteria, and in an embodiment using the least recently used (LRU) method. The context tag of the entry selected for removal (e.g., the victim) from the context tag table is invalidated in all the virtually tagged caches and the context tag is repurposed to a new value, i.e., the context tag and its respective mappings (LPID/PID) of the new context. That is, if the new context, e.g., new context tag is not in the context tag table (510: No), then at 520, an appropriate entry to remove from the context tag table is selected. The appropriate entry to remove in an embodiment is not the current thread that was running. After the appropriate entry to remove from the context tag table is selected, at 525 that entry (e.g., that LPID and/or PID combination) is removed from the context tag table. At 530, the context tag of the entry selected for removal and removed from the context tag table is invalidated in all the virtually tagged caches. At 535 the context tag of the entry removed from the context tag table is updated and/or repurposed to the new context, e.g., the new context tag with the new LPID and/or PID. In one or more embodiments the context tag that was running when the system encountered the context switch remains in the context tag table and in the virtually tagged caches. In one or more embodiments, only the context (e.g., context tag and associated mapping of LPID and/or PID) is invalidated and removed from the caches.

Figure 6:
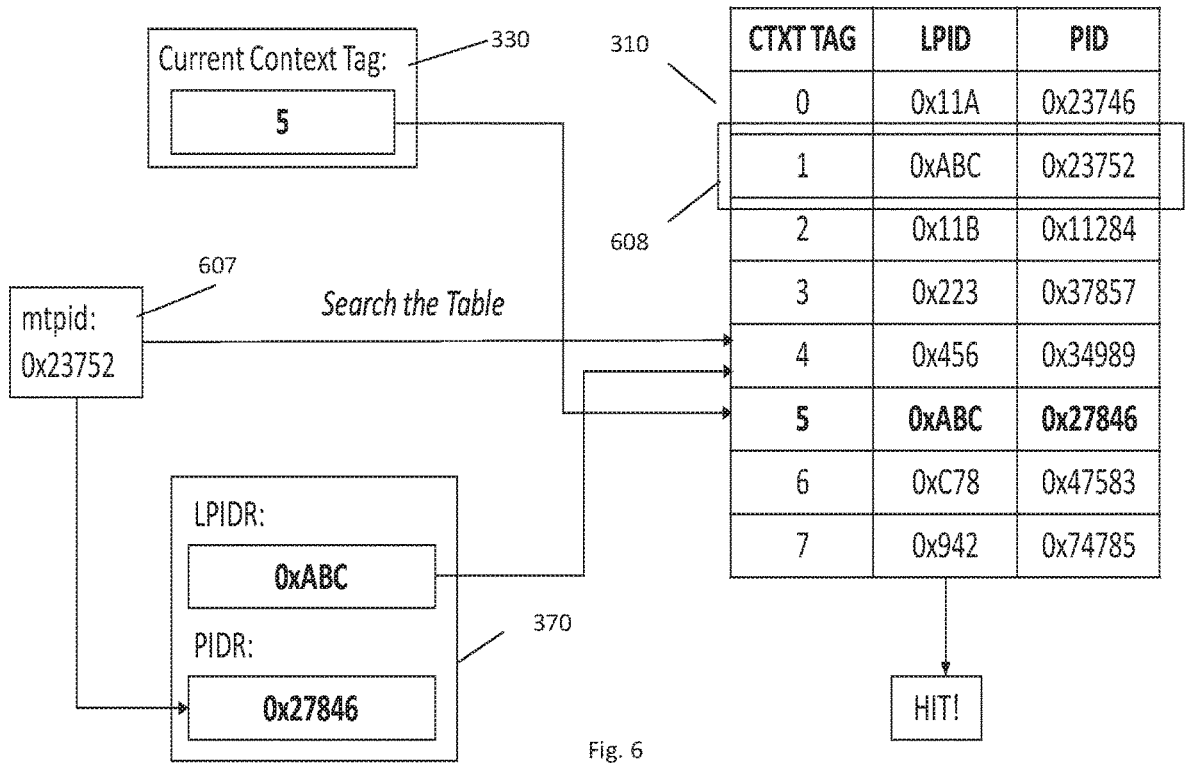
FIG. 6 and FIG. 7 illustrate an example of a single threaded in an information handling system undergoing a context switch.
Figure 7:
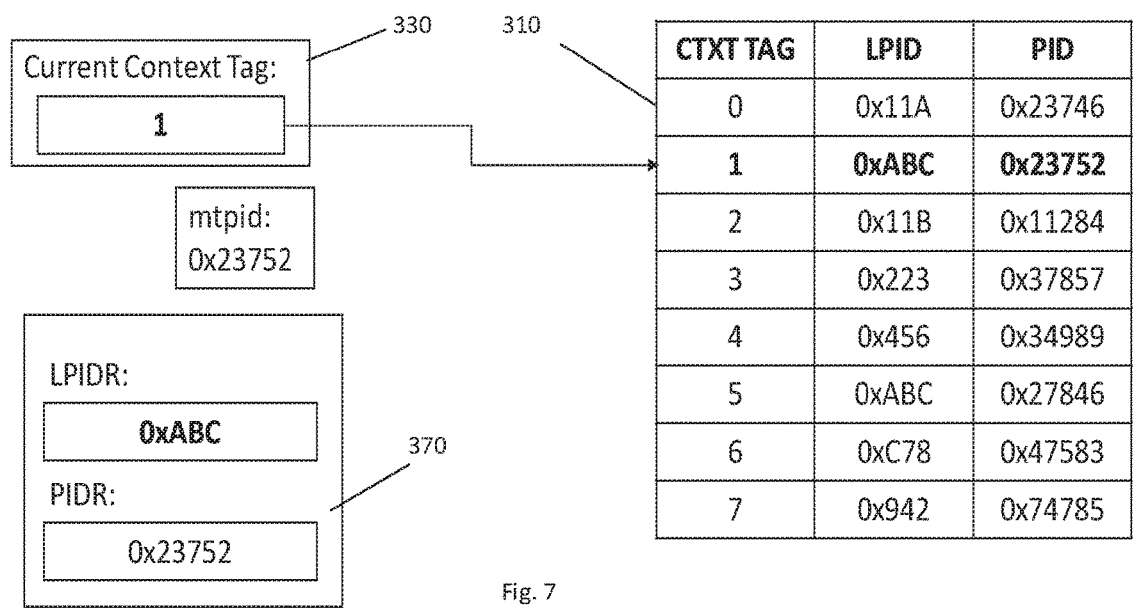

Implementations of one of more embodiment of a virtually tagged cache will be discussed in connection with FIGS. 6-10 and 15-23. FIGS. 6 and 7 show an example of a single thread context switch where there is a hit in the context tag table upon a context switch. FIG. 6 shows the current context tag as tag 5 as per the scratch register 330, and the context tag table 310 and the current thread context registers 370 show the LPID as 0xABC and the PID as 0x27846. The context is switching (as a result of mtpid instruction 607) to a PID of 0x23752. The PID 0x23752 is a hit in the context tag table 310 as shown by box 608 in FIG. 6, and as illustrated in FIG. 7 the current context tag is updated to tag 1 as shown by the scratch register 330, context tag table 310, and the current thread context registers 370.

Figure 8:
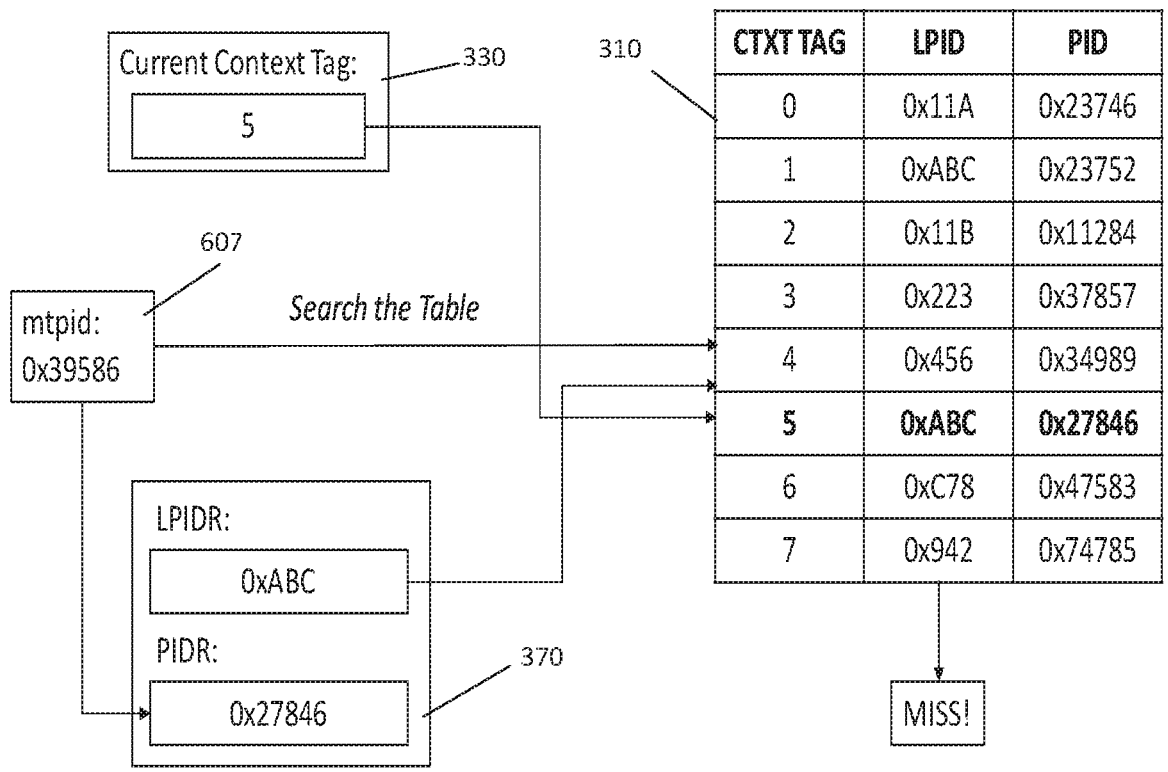
FIG. 8, FIG. 9, and FIG. 10 illustrate another example of a single threaded information handling system undergoing a context switch.
Figure 9:
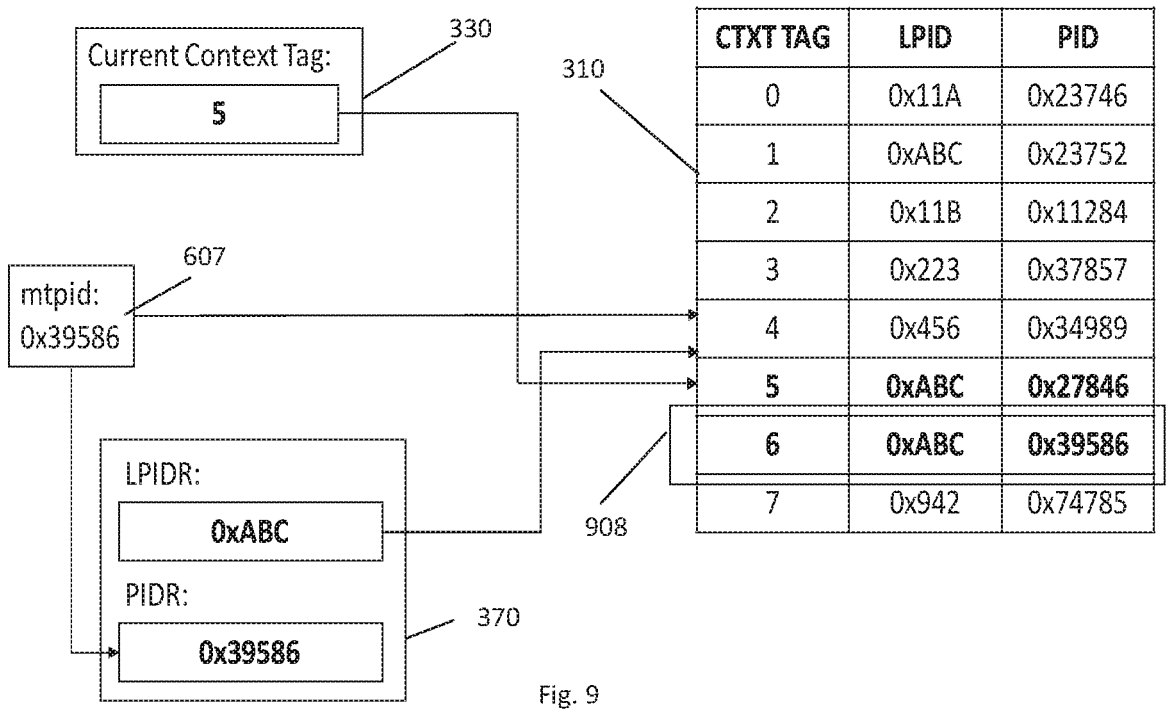
Figure 10:
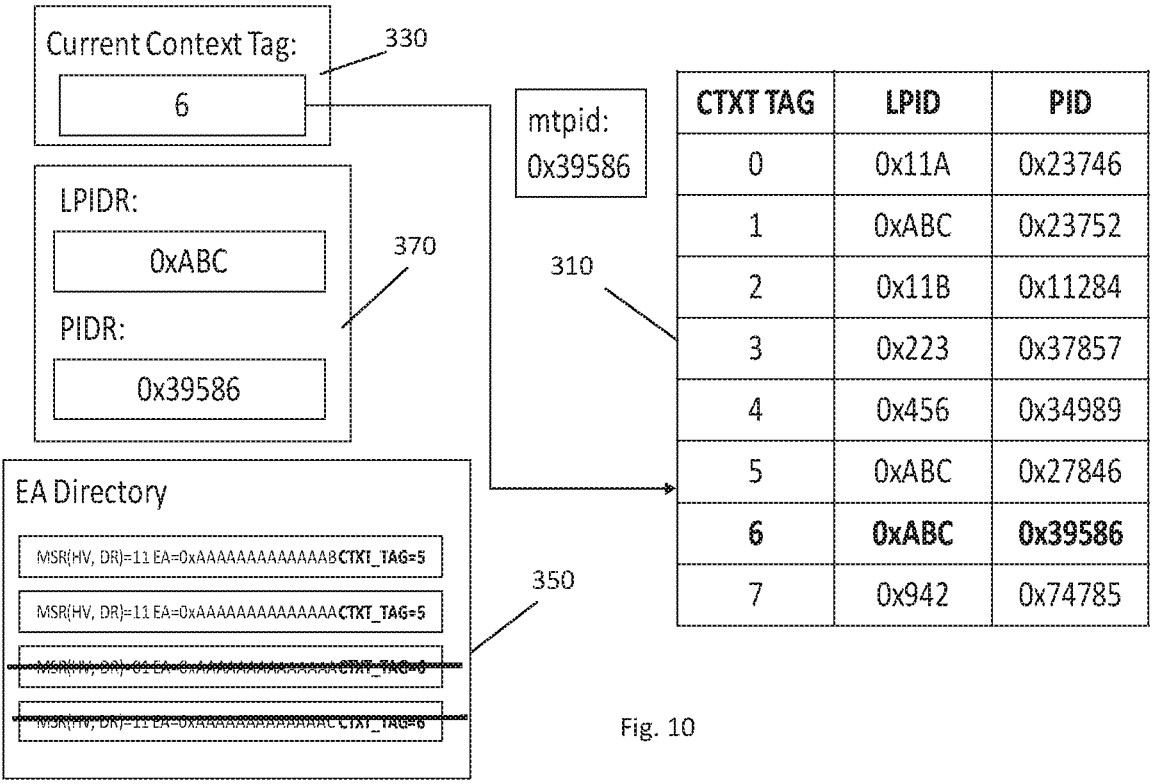

FIGS. 8-10 show an example of a context switch in a system running a single thread where there is a miss in the context tag table upon a context switch. The current context tag is shown by bolded entries in FIGS. 8-10. FIG. 8 shows the current context tag 5 as per scratch register 330, where the context table 310 shows context tag 5 as having a LPID of 0xABC and a PID of 0x27846, and the current thread context registers 370 shows the values of the LPID in the LPIDR as 0xABC and the value of the PID in the PIDR as 0x27846. The context is switching as a result of mtpid instruction 607 to PID 0x39686. The PID of 0x39586 is not contained in the context tag table 310 and is a miss. A victim needs to be chosen in the context tag table 310 to make room for the new context tag since the context tag table 310 is full. The victim to evict in the context tag table 310 can be chosen based upon a number of criteria and in an embodiment the victim is chosen using the LRU method. The context tag 6 having an LPID of 0xC78 and PID of 0x47583 as shown in FIG. 8 is chosen and evicted from the context tag table 310, and is replaced as shown in FIG. 9 with LPID 0xABC and PID 0x39586 in context tag table 310 and the current thread context registers 370. The entries in the virtual cache directory 350 (and all the entries in the virtually tagged caches) pertaining to the evicted context tag 6 (LPID=0xC78 and PID 0x47583) are invalidated in all the virtually tagged caches as shown in FIG. 10. The current context tag is updated to tag 6 as shown in FIG. 10 in scratch register 330, context tag table 310, and the current thread context registers 370. Notice that the previous context tag 5 is preserved in the context tag table 310 as are the various entries in the virtually tagged caches pertaining to previous context tag 5.

Figure 11:
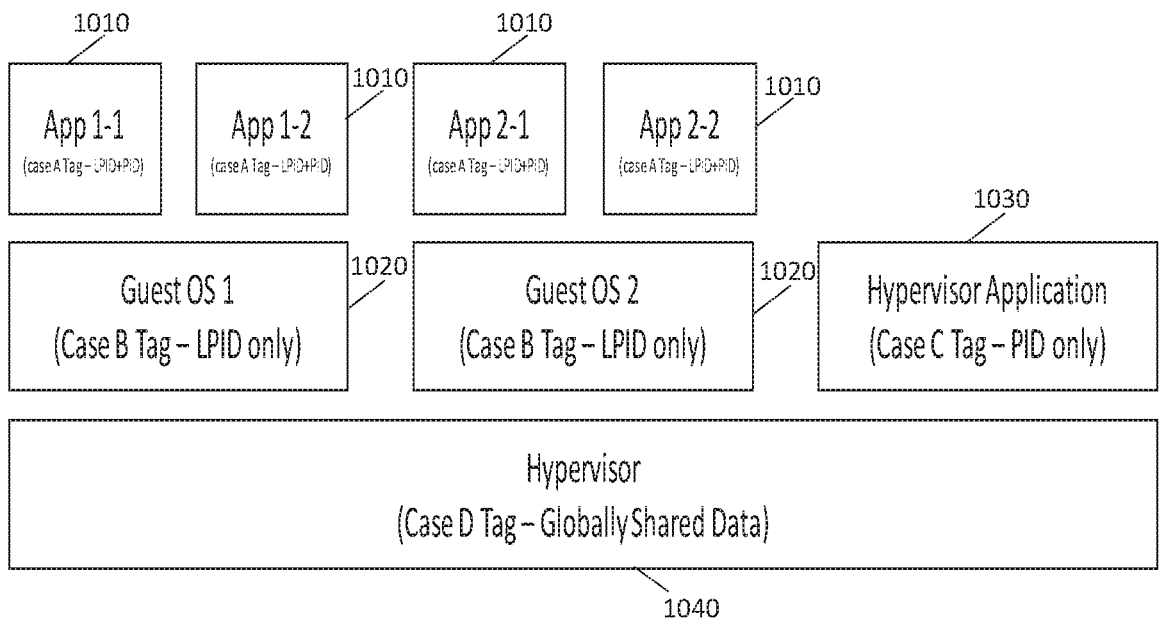
FIG. 11 shows the context cases or layers of address space that can occur in an embodiment of a virtualized computerized system.

FIG. 11 is a logical block diagram 1000 of an exemplary system having four layers or cases of address space, including for example applications 1010 on the guest OS, the guest OS 1020, the hypervisor processes (or applications) 1030, and the hypervisor 1040. Other layers of address space, e.g., cases are contemplated, and may vary by the virtualization architecture. Applications 1010 on the guest OS are referred to as Case A, and include Case A.1 which encompasses all addresses that have a unique LPID and a unique PID value (e.g. for radix translations) and Case A.2 which encompasses all addresses that have a unique LPID and a SLB context (e.g., for Hierarchical Page Table (HPT) translations). That is, Case A.1 covers LPID and PID identified address spaces while Case A.2 covers LPID and SLB context identified address spaces. The guest OS 1020, referred to as Case B, encompasses all addresses that have a unique LPID only, while the Hypervisor application 1030, referred to as Case C, encompasses all addresses that have a unique PID only. Hypervisor 1040, referred to as Case D, encompasses all addresses that are globally shared. In one or more embodiments, all four Cases A-D will be tracked concurrently using four context tag tables. To differentiate between Case A.1 and Case A.2, different context tags are used in an embodiment to differentiate between the radix translations and the HPT translations. In an aspect, HPT translations that use the SLB are mapped as Case A context tags and the different HPT translations are distinguished by a hardware thread ID.

Figure 12:
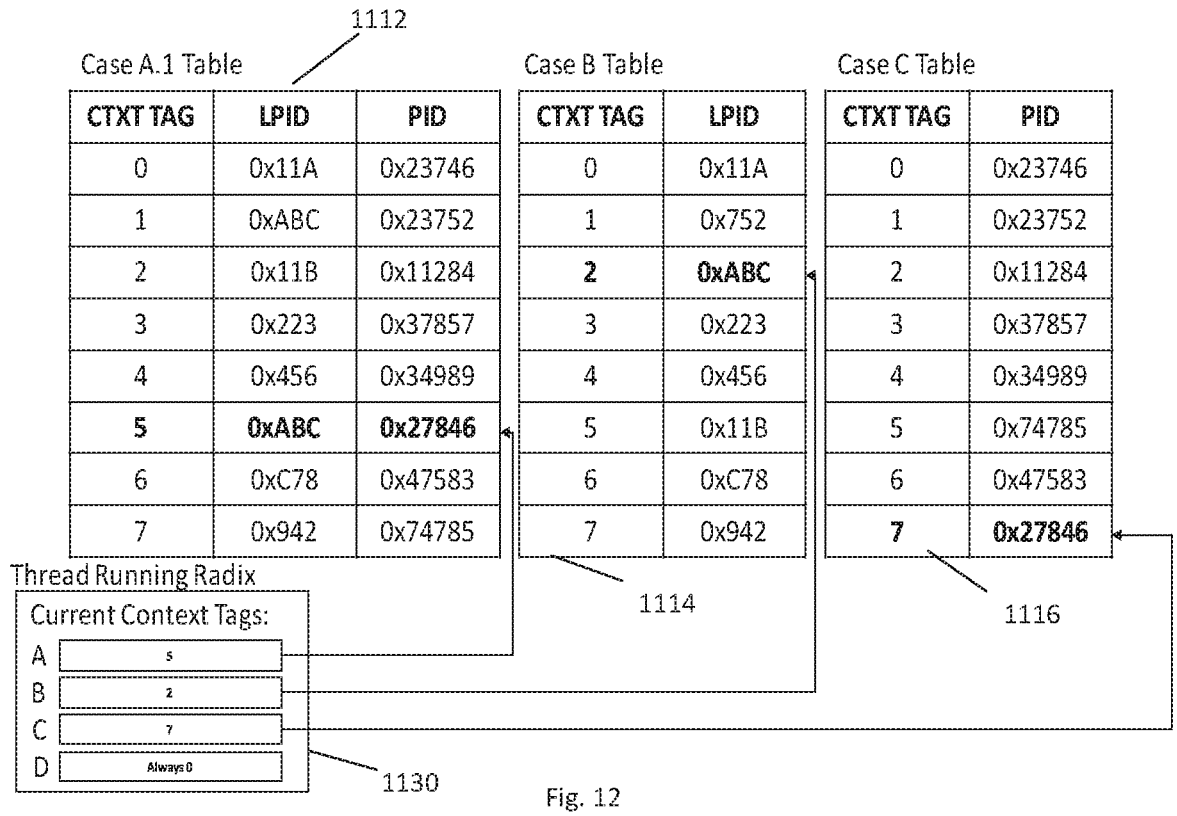
FIG. 12 illustrates an example of the case context tables and scratch register for a virtualized computer system for a thread of instruction using Radix address translations.
Figure 13:
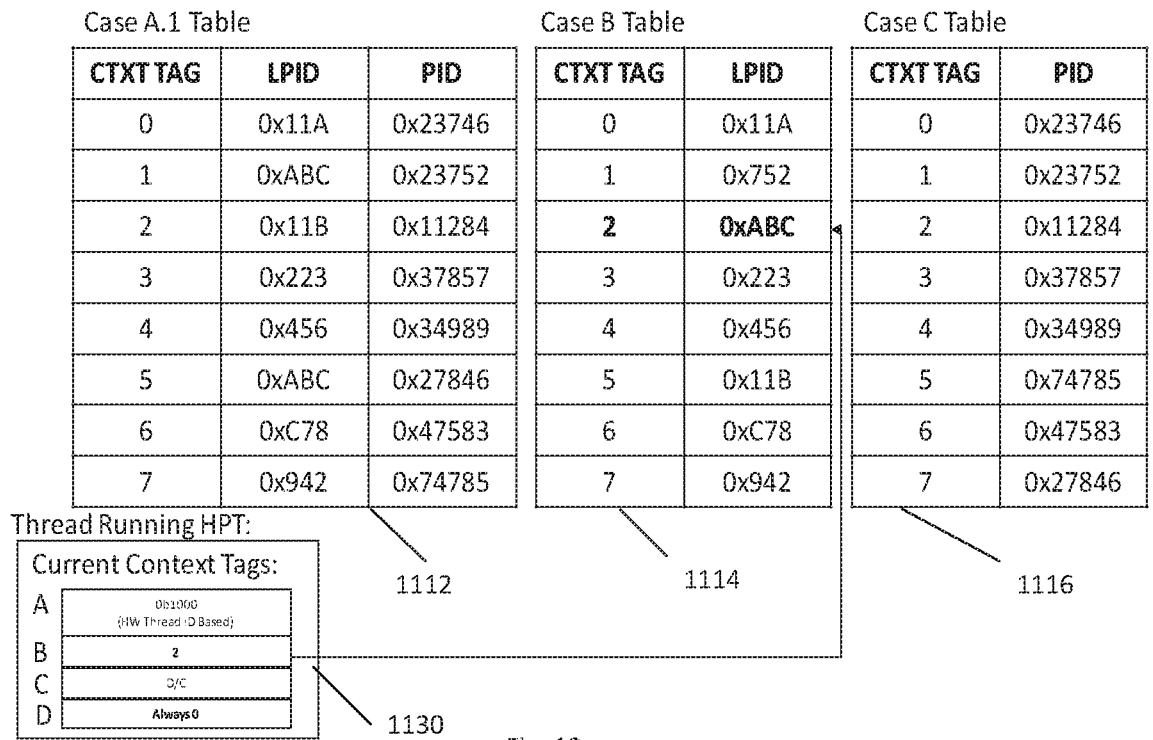
FIG. 13 illustrates an example of the case context tables and scratch register for a virtualized computer system for a thread of instruction using Hierarchal Page Table (HPT) address translations.

FIG. 12 shows the scratch register 1130 illustrating the current context tag running in each of the four Cases A-D, and the Case A context tag table 1112, the Case B context tag table 1114, and the Case C context tag table 1116 for a single thread running Radix translations, while FIG. 13 shows the scratch register 1130 illustrating the current context tag running on each of the four Cases A-D, and the Case A context tag table 1112, the Case B context tag table 1114, and the Case C context tag table 1116 for a single thread running HPT translations. The boxes with the bolded entries in FIGS. 12 and 13 are showing the current context tags running in the various Cases A-C (layers of address space). Note in FIG. 13 that the thread is running HPT translations so the current context tag for Case A is hardware thread ID based. The current context tag in scratch register 1130 for Case C is shown as D/C because HPT threads cannot have a Case C context tag. Context Tag Table D is not shown because in one or more embodiments the context tag is always zero (0).

Figures 14, 15:
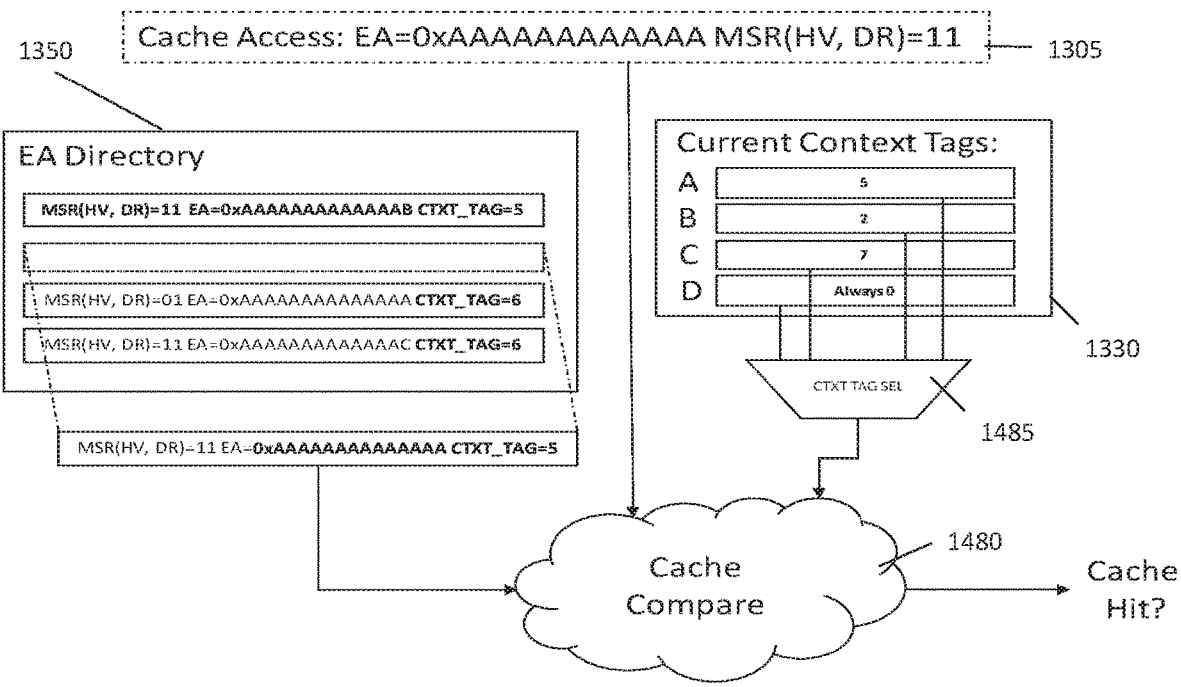
FIG. 14 illustrates a block diagram of a virtualized information handling system having four context cases or layers of address space undergoing access to a virtually tagged cache.
FIG. 15, FIG. 16, and FIG. 17 show an example of a virtualized information handling system having four context cases or layers of address space undergoing a context switch.

FIG. 14 shows a cache access where there are four layers of address space, e.g., the four Cases A-D of FIG. 11, where the cache must chose which of the four context tags will be used in the cache look-up. In FIG. 14 the EA of the memory access 1305 (and in one or more embodiments other information, such as for example information from the MSR) as well as the current context running on the thread will be compared in comparator 1480 with information in the entries in the virtual tagged cache directory. In an aspect, the current context the thread is running is determined and/or provided by the current context tag provided by the scratch register 1330. The current context tag from the scratch register 1330 will be selected (by multiplexor (mux) 1485 connected to the output of the scratch register 1330. To determine whether there is a hit or miss in the virtually tagged cache, the EA from the memory access 1305, the current context tag from scratch register 1330 (as selected by the multiplexor 1485) and in an embodiment additional information is compared to entries in the virtually tagged cache directory 1350. In a processor environment that handles multiple threads simultaneously, e.g., four threads, in one or more embodiments each thread tracks each layer of address space (each Case A-D) so in an embodiment there should be a scratch register 1330 for each thread storing and identifying the current context tag for each of Cases A-D (each layer of address space). That is, in the example embodiment there would be a total of sixteen current context tags, and scratch registers, in an embodiment, to track each current context tag. In this multithread processing environment, the cache lookups in an aspect should also select (mux down) the context tag based on thread ID. The context tables in one or more embodiments are shared among all threads on a single core. In an aspect the system, e.g., the MMU, should not evict a context tag in use by another thread.

Figure 16:
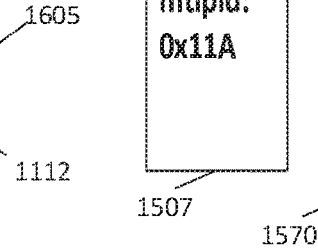
Figure 16:
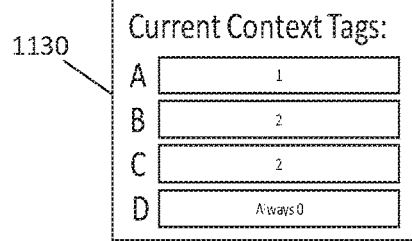
Figure 17:
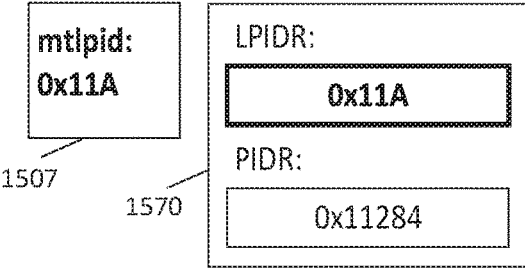
Figure 17:
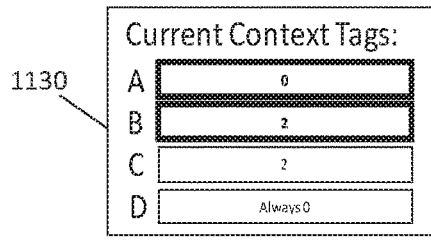

FIGS. 15-23 illustrates how a system utilizing virtually tagged caches undergoes context switches in a system having the four layers of address space, e.g., four Cases A-D, illustrated in FIG. 11. FIGS. 15-20 illustrates how a system utilizing virtually tagged caches undergoes a context switch in the logical partition ID, for example as a result of a mtplid instruction. The current context tag is illustrated in FIGS. 15-20 by bolded entries. As shown in FIG. 15, a system is running currently in a context having a LPID of 0xABC and a PID of 0x11284 as shown by current thread context register 1570, which correlates to current context tag 1 in Case A context tag table 1112, context tag 2 in Case B context tag table 1114, and context tag 2 in Case C context tag table 1116. The system in FIG. 15 is undergoing a context switch to new LPID 0x11A, for example as a result of mtlpid instruction 1507. As the context switch in this example pertains to a new LPID 0x11A, only Case A context tag table 1112 and Case B context tag table 1114 are searched. Case C context tag table 1116 as illustrated in FIG. 15 is not searched. As shown in FIG. 16, the new LPID exists (hits) in Case A context tag table 1112 (shown by box 1605 as context tag 0) and in Case B context tag table 1114 (shown in box 1608 as context tag 0), and as shown in FIG. 17 the current context tags for Case A Table 1112 and Case B Table 1114 are updated to context tag 0 in both tables, in the scratch register 1130 for Case A and B Tables, and in the LPIDR to 0x11A for the current thread context tag register 1570. Since the context tags were in the respective registers, no invalidations were necessary or issued, and the entries in the virtual caches for Cases A-D are preserved.

As shown in FIG. 18, a system is running currently in a context having a LPID of 0xABC and a PID of 0x11284 as shown by current thread context register 1570, which correlates to current context tag 1 in Case A context tag table 1112, context tag 2 in Case B context tag table 1114, and context tag 2 in Case C context tag table 1116. The system in FIG. 18 is undergoing a context switch to new LPID 0x11B, for example as a result of a mtplid instruction 1807. As the context switch in this example pertains to a new LPID 0x11B, only Case A context tag table 1112 and Case B context tag table 1114 are searched. Case C context tag table 1116 is not searched as illustrated in FIG. 18. As shown in FIG. 19, the new LPID exists (hits) in Case A context tag table 1112 (shown as box 1908 containing context tag 2), but misses (does not exist) in Case B context tag table 1114. A victim is selected in Case B context table 1114, using any number of selection criteria, but in an embodiment using a LRU method of selection. As shown by box 1905 in FIG. 19, context tag 3 in Case B context tag table 1114 is selected to be removed, and is replaced with new LPID 0x11B as shown in FIG. 20. In addition, as shown in FIG. 20, the current context tags for Case A and Case B are updated to context tags 2 and 3 respectively in the context tag tables 1112 and 1114 and in the scratch register 1130. The LPIDR in the current thread context tag register 1570 is updated to 0x11B. Since the new context tag was not in the Case B context tag table 1114 on the context switch, the MMU broadcasts an invalidation instruction to invalidate the Case B entries in the virtual caches. Entries in the virtual caches for Cases A, C, and D are preserved.

FIGS. 15-20 illustrate a system having multiple layers of addresses, e.g., multiple Cases A-D as shown in FIG. 11, undergoing context switches from one logical partition space (LPID) or guest operating system to another LPID or guest operating system, where in FIGS. 15-17 the new context hits in each of Case A context tag table 1112 and Case B context tag table 1114 and so no Case A or Case B context tag table entries in the virtual caches need to be invalidated and the Case A-D virtual cache entries are preserved. In FIGS. 18-20 the new context hits in Case A context tag table 1112, but misses in Case B context tag table 1114 and so entries in the virtual caches pertaining to the context tag removed from Case B context tag table 1114 should to be invalidated and the Case A, C, and D virtual cache entries are preserved. Not shown is a context switch where the new context misses in Case A context tag table 1112 but hits in Case B context tag table 1114 and so entries in the virtual caches pertaining to the context tag selected and removed from Case A context tag table 1112 should to be invalidated and the Case B, C, and D virtual cache entries are preserved. Also not shown is where the new context misses in Case A context tag table 1112 and misses in Case B context tag table 1114 and so entries in the virtual caches pertaining to the context tags selected and removed from both Case A context tag table 1112 and Case B context tag table 1114 should to be invalidated and the Case C and Case D virtual cache entries are preserved.

FIGS. 21-23 illustrates how a system having four layers of address space, e.g., the four Cases A-D of FIG. 11 utilizing virtually tagged caches undergoes a different context switch than the context switches illustrated in the examples of FIGS. 15-20, and more specifically undergoes a context switch in the process ID (PID), for example as a result of a mtpid instruction. The current context tag is illustrated in FIGS. 21-23 by bolded entries. As shown in FIG. 21, a system is running currently in a context having a LPID of 0xABC and a PID of 0x11284 as shown by current thread context register 1570, which correlates to current context tag 1 in Case A context tag table 1112, context tag 2 in Case B context tag table 1114, and context tag 2 in Case C context tag table 1116. The current context tags for each of the Cases A-D is shown in scratch register 1130. The system in FIG. 21 is undergoing a context switch to new PID 0x37857, for example as a result of a mtpid instruction 2107. As the context switch in this example pertains to a new PID 0x37857, only Case A context tag table 1112 and Case C context tag table 1116 are searched. Case B context tag table 1114 is not searched as illustrated in FIG. 21. As shown in FIG. 22, the new PID exists (hits) in Case A context tag table 1112 (as shown by box 2208 containing context tag 3), but misses (does not exist) in Case C context tag table 1116. A victim is selected in Case C context table 1116 as shown by box 2209 in FIG. 22, using any number of selection criteria, but in an embodiment using a LRU method of selection. In the example of FIGS. 21-23, context tag 3 in Case C context tag table 1116 is selected to be removed, and is replaced with new PID 0x37857 as shown in FIG. 23. In addition, as shown in FIG. 23, the current context tags for Case A and Case C are updated to context tags 3 and 3 respectively in the context tag tables 1112 and 1114 and in the scratch register 1130. The PIDR in the current thread context tag register 1570 is updated to 0x37857. Since the new context tag was not in the Case C context tag table 1116 on the context switch, the MMU broadcasts an invalidation instruction to invalidate the entries in the virtual caches pertaining to the context removed from Case C context tag table. Entries in the virtual caches for Cases A, B, and D are preserved.

FIGS. 21-23 illustrate a system having multiple layers of addresses, e.g., multiple Cases A-D as shown in FIG. 11, undergoing context switches from one process space (PID) to another process space (PID) where the new context hits in Case A context tag table 1112, but misses in Case C context tag table 1116 and so entries in the virtual caches pertaining to the context tag removed from Case C context tag table 1116 need to be invalidated and the Case A, B, and D virtual cache entries are preserved. Not shown is a context switch where the new context hits in Case A context tag table 1112 and Case C context tag table 1116 and so no Case A or Case C context tag table entries in the virtual caches need to be invalidated and the Case A-D virtual cache entries are preserved. Where there is a hit in the Case A Table 1112 and Case C table 1116, both Case A and Case C current context tags are updated. Also not shown is a context switch where the new context switch misses in Case A context tag table 1112 but hits in Case C context tag table 1116 and so entries in the virtual caches pertaining to the context tag selected and removed from Case A context tag table 1112 need to be invalidated and the Case B, C, and D virtual cache entries are preserved. Also not shown is where the new context misses in Case A context tag table 1112 and misses in Case C context tag table 1116 and so entries in the virtual caches pertaining to the context tags selected and removed from both Case A context tag table 1112 and Case C context tag table 1116 need to be invalidated and the Case B and Case D virtual cache entries are preserved.

In one or more embodiments, the Case A Context Tag Table 1112 should always have an entry for all four thread's LPIDR and PIDR values, regardless of SMT mode. The Case B Context Tag Table 1114 in an embodiment should always have an entry for all four thread's LPIDR values, regardless of SMT mode, while in an aspect Case C Context Tag Table 1116 in an embodiment should always have an entry for all four thread's PIDR values, regardless of SMT mode. The value of the current context tag pointers for every thread and for all Cases A-D in one or more embodiments should always point to an entry that matches the LPIDR and PIDR registers, regardless of SMT mode.

In one or more embodiments a method of processing electronic information in an information handling system is disclosed where the method includes performing a memory access operation to a virtually tagged cache, the access operation comprising: obtaining from a scratch register a current context tag, wherein the current context tag is one of a plurality of context tags running on the information handling system, each context tag is an encoding for one of a plurality of layers of address space containing less bits than the number of bits to represent one of the plurality of layers of address space, and the current context tag identifies the layer of address space that a thread of instructions is currently running; and comparing at least the current context tag from the scratch register to context tags in entries in a directory of the virtually tagged cache.

The method further comprising in an embodiment determining whether a context switch to a new layer of address space is encountered and in response to encountering a context switch to a new context having a new layer of address space, search for the new context in the context tag table. In an aspect, searching for the new context in the context tag table includes obtaining a new context tag from the scratch register to compare against context tags in the context table, and comparing the context tag obtained from the scratch register with the context tags in the context tag table. In an embodiment, in response to the new context tag being present in the context tag table, the method includes updating the system to the new context tag, where in an aspect updating the system to the new context tag comprises writing the new context tag to the scratch register.

Additionally, or alternatively, in an embodiment, in response to the new context not being contained within the context tag table, the method includes adding a new context tag for the new context to the context tag table. In response to the new context not being contained within the context tag table, the method preferably includes selecting an entry to remove from the plurality of entries in the context tag table. In one or more embodiments, the entry selected for removal from the plurality of entries in the context tag table is not the context tag of the thread of instructions of the current context tag. In one or more embodiments, the method preserves information in the virtually tagged cache when performing a context switch in the system to process electronic information from a new layer of address space different than the current layer of address space on which the processor is operating. In an embodiment, the method selects the entry for removal from the context tag table by a least recently used (LRU) method of selection. The method further includes in an embodiment removing the selected entry from the context tag table. In an embodiment, all entries in the one or more virtually tagged caches are invalidated that have the same context tag as the selected entry removed from the context table. In a preferred embodiment, the method further includes invalidating only the entries in the one or more virtually tagged caches that have the same context tag as the selected entry removed from the context table. In a further aspect, in response to removing the selected entry from the context tag table, the method includes updating the selected entry removed from the context table to have the context tag and associated mapping to one of the plurality of layers of address space of the new context tag.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. What is meant is by executable by the processor is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of handling electronic information comprising:
   a processor for processing the electronic information;
   at least one virtually tagged cache having a directory and a plurality of entries containing electronic information, the directory containing multiple entries, each entry configured to comprise at least a virtual address and one of a plurality of context tags, wherein each context tag is an encoding for one of a plurality of layers of address space containing less bits than the number of bits to represent the one of the plurality of layers of address space;
   a context tag table having a plurality of entries, each entry configured to map one of the plurality of context tags to one of the plurality of layers of space; and
   a scratch register having one or more entries and configured to contain a current context tag for a current layer of address space on which the processor is processing a thread of instructions,
   wherein the virtually tagged cache is configured to preserve information in the virtually tagged cache when performing a context switch in the system to process electronic information from a new layer of address space different than the current layer of address space on which the processor is operating.

2. The system of claim 1, wherein the system permits more than one layer of address space to be dynamically accessible at any given time to a hardware thread.

3. The system of claim 1, further comprising the system configured to determine whether a context switch to a new layer of address space is encountered.

4. The system of claim 1, further comprising the system configured to, in response to encountering a context switch to a new context having a new layer of address space, search for the new context in the context tag table.

5. The system of claim 4, wherein searching for the new context in the context tag table comprises obtaining a new context tag from the scratch register to compare against context tags in the context table.

6. The system of claim 5, further comprising the system configured to compare the context tag obtained from the scratch register with the context tags in the context tag table.

7. The system of claim 6, further comprising the system configured to, in response to the new context tag being present in the context tag table, updating the system to the new context tag.

8. The system of claim 7, wherein updating the system to the new context tag comprises writing the new context tag to the scratch register.

9. The system of claim 4, further comprising the system configured to, in response to the new context not being contained within the context tag table, adding a new context tag for the new context to the context tag table.

10. A system of claim 4, further comprising the system configured to, in response to the new context not being contained within the context tag table, selecting an entry to remove from the plurality of entries in the context tag table.

11. The system of claim 10, further comprising the system configured to remove the selected entry from the context tag table.

12. The system of claim 11, further comprising the system configured to invalidate all entries in the one or more virtually tagged caches that have the same context tag as the selected entry removed from the context table.

13. The system of claim 12, further comprising the system configured to invalidate only the entries in the one or more virtually tagged caches that have the same context tag as the selected entry removed from the context table.

14. The system of claim 11, further comprising the system configured to, in response to removing the selected entry from the context tag table, updating the selected entry removed from the context table to have the context tag and associated mapping to one of the plurality of layers of address space of the new context tag.

15. The system of claim 1, further comprising:
a plurality of context tag tables, each context tag table containing a plurality of entries mapping one of a plurality of context tags to one layer of the plurality of layers of address space; and
a plurality of scratch registers, each scratch register having an entry containing the current context tag for each layer of address space on which the processor is processing a thread of instructions.

16. The system of claim 1, wherein the plurality of layers of address space processed in the system comprise four layers of address space comprising a hypervisor layer of address space, a hypervisor process layer of address space, a logical partition layer of address space identified by a logical partition identifier (LPID), and a process layer of address space identified by a process identifier (PID); and
the system comprises at least four context tag tables and four scratch registers, at least one context tag table and scratch register for each of the four layers of address space, wherein the context tag comprises an encoding of at least one of the group consisting of the LPID alone, the PID alone, and a combination of the LPID and PID.

17. The system of claim 16, wherein the system comprises at least one context tag table for each thread of instructions processed by the system.

18. The system of claim 1, wherein the system is configured to perform a memory access operation to the virtually tagged cache, the access operation comprising:
obtaining from the scratch register the current context tag;
comparing at least the current context tag from the scratch register to context tags in entries in the directory of the virtually tagged cache.

19. A computing system comprising:
a processor comprising:
a memory management unit (MMU) for managing address translations, the MMU comprising:
at least one virtually tagged cache having a directory and a plurality of entries containing information, the directory containing multiple entries, each entry comprising at least a virtual address and one of a plurality of context tags, wherein each context tag is an encoding for one of a plurality of layers of address space containing less bits than the number of bits to represent one of the plurality of the layers of address space;
a context tag table having a plurality of entries, each entry configured to map one of the plurality of context tags to one of the plurality of layers of space;
a scratch register having one or more entries and configured to contain a current context tag for a current layer of address space on which the processor is processing a thread of instructions; and
a non-transitory computer-readable storage medium comprising program instructions that when executed by the processor cause the system to:
preserve information in the virtually tagged cache when performing a context switch in the system to process information from a new layer of address space different than the current layer of address space on which the processor is operating;
in response to a memory access, obtain from the scratch register the current context tag; and
compare at least the current context tag from the scratch register to context tags in entries in the directory of the virtually tagged cache.

20. The system of claim 19, further comprising computer-readable storage medium comprising program instructions that when executed by the processor cause the system to:
in response to encountering a context switch to a new context having a new layer of address space, search for the new context in the context tag table;
in response to searching for the new context in the context tag table, obtain a new context tag from the scratch register to compare against context tags in the context table;
compare the context tag obtained from the scratch register with the context tags in the context tag table;
in response to the new context tag being present in the context tag table, update the system to the new context tag;
in response to the new context not being contained within the context tag table, selecting an entry to remove from the plurality of entries in the context tag table;
in response to selecting an entry to remove from the plurality of entries in the context table, remove the selected entry from the context tag table;
in response to removing the selected entry from the context table, invalidate only the entries in the one or more virtually tagged caches that have the same context tag as the selected entry removed from the context table; and
in response to removing the selected entry from the context tag table, update the selected entry removed from the context table to have the context tag and associated mapping to one of the plurality of layers of address space of the new context tag.

* * * * *